(12) United States Patent
Adema et al.

(10) Patent No.: US 11,402,561 B2
(45) Date of Patent: Aug. 2, 2022

(54) OPTICAL ELEMENTS FOR DISPLAYS

(71) Applicant: GOOGLE LLC, Mountain View, CA (US)

(72) Inventors: Daniel Adema, Kitchener (CA); Ian Andrews, Kitchener (CA); Timothy Paul Bodiya, Toronto (CA); Shreyas Potnis, Kitchener (CA)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 17/145,364

(22) Filed: Jan. 10, 2021

(65) Prior Publication Data

US 2021/0215868 A1    Jul. 15, 2021

Related U.S. Application Data

(60) Provisional application No. 62/959,436, filed on Jan. 10, 2020.

(51) Int. Cl.
*G02B 6/34* (2006.01)
*F21V 8/00* (2006.01)

(52) U.S. Cl.
CPC .............................. *G02B 6/0025* (2013.01)

(58) Field of Classification Search
CPC ................ G02B 6/0025; G02B 6/34; G02B 2027/0178; G02B 27/0172
See application file for complete search history.

(56) References Cited

U.S. PATENT DOCUMENTS

| | | | |
|---|---|---|---|
| 2007/0070490 A1* | 3/2007 | Tsunoda | G02B 5/08 359/308 |
| 2019/0056599 A1* | 2/2019 | Reshidko | G02B 27/0179 |
| 2019/0086674 A1* | 3/2019 | Sinay | G06T 19/006 |
| 2019/0265479 A1* | 8/2019 | Yokoyama | G02B 27/0172 |
| 2019/0377185 A1* | 12/2019 | Cheng | G03B 21/208 |

* cited by examiner

*Primary Examiner* — Ellen E Kim

(57) ABSTRACT

An optical element for implementation in a heads-up display or other near-eye display system includes a lightguide and an incoupler optically coupled to the lightguide. The incoupler receives a display beam incident upon the lightguide at a first incidence position. The incoupler directs a first portion of the display beam into the lightguide to form an incoupled beam and causes a second portion to remain non-incoupled relative to the lightguide to form a non-incoupled beam. The optical element further includes a reflector to receive the non-incoupled beam and to reflect the non-incoupled beam towards the incoupler to form a reflected beam incident upon the incoupler at a second incidence position. The incoupler direct a corresponding portion of the reflected beam into the lightguide to form a further incoupled beam.

22 Claims, 21 Drawing Sheets

OPTICAL ELEMENTS FOR DISPLAYS

CROSS-REFERENCE TO RELATED APPLICATIONS

The present application claims priority to U.S. Patent Application No. 62/959,436, entitled "OPTICAL ELEMENTS FOR DISPLAYS" and filed on Jan. 10, 2020, the entirety of which is incorporated herein by reference.

BACKGROUND

Heads-up displays and other near-eye display systems often utilize a lightguide (also referred to as a "waveguide") to guide display light generated by a display source (e.g., a light engine or microdisplay) toward a user's eye along an optical path. This optical path typically also includes other optical elements, such as an incoupler (IC) to input light from the display source into the lightguide and an outcoupler (OC) to direct light out of the lightguide toward the user's eye. These optical elements often have inefficiencies or may cause non-uniformities in the displayed images. Some of these inefficiencies may include portions of the display light being lost or becoming otherwise unavailable for forming an image, particular with regard to the transmission of light from the display source into the lightguide via the IC. Moreover, some of the non-uniformities may include variations in intensity or color balance across the field of view of the image being projected.

SUMMARY OF EMBODIMENTS

According to an implementation of the present disclosure there is provided an optical element comprising: a lightguide; an incoupler optically coupled to the lightguide, the incoupler to receive a display beam incident upon the lightguide at a first incidence position, the incoupler to direct a first portion of the display beam into the lightguide to form an incoupled beam and to cause a second portion to remain non-incoupled relative to the lightguide to form a non-incoupled beam; and a reflector to receive the non-incoupled beam and reflect the non-incoupled beam towards the incoupler to form a reflected beam incident upon the incoupler at a second incidence position, the incoupler to direct a corresponding portion of the reflected beam into the lightguide to form a further incoupled beam. The reflector may comprise a reflective metalized layer disposed on a surface of the lightguide.

The reflector may comprise a prism optically coupled to the incoupler. The prism may be secured to the lightguide. The prism may comprise a reflective side. The reflective side may be curved to reduce a divergence of at least one of the non-incoupled beam and the reflected beam. The prism may comprise a further reflective side. The further reflective side may be curved to reduce a divergence of at least one of the non-incoupled beam and the reflected beam. The prism may comprise a curved transmissive side to reduce a divergence of at least one of the non-incoupled beam and the reflected beam.

The reflector may direct the reflected beam towards the incoupler to position the second incidence position to be substantially the same as the first incidence position. The reflector may be to direct the reflected beam towards the incoupler to position the second incidence position to be spaced from the first incidence position.

The incoupled beam may have a bounce separation inside the lightguide; and the reflector may be to direct the reflected beam towards the incoupler to position the second incidence position to be at a distance from the first incidence position, the distance being other than an integer multiple of the bounce separation (that is, a non-integer multiple of the bounce separation).

The reflector may further comprise a divergence-reducing element disposed in an optical path of at least one of the non-incoupled beam and the reflected beam between the incoupler and the reflector, the divergence-reducing element to reduce a divergence of the at least one of the non-incoupled beam and the reflected beam. The divergence-reducing element may comprise a concave reflector. The divergence-reducing element may comprise a lens. The divergence-reducing element may be to adjust the divergence of the reflected beam at the second incidence position to be substantially the same as a corresponding divergence of the display beam at the first incidence position.

The optical element may further comprise an outcoupler optically coupled to the lightguide, the outcoupler to direct at least a corresponding portion of each of the incoupled beam and the further incoupled beam out of the lightguide to form outcoupled beams propagating towards an eye of a user to form an image viewable by the user.

The incoupler may be further to direct a third portion of the display beam into the lightguide, the first portion propagating in the lightguide towards the outcoupler and the third portion propagating in the lightguide away from the outcoupler; and the optical element may further comprise a further reflector optically coupled to the lightguide, the further reflector to reflect the third portion to form a further reflected beam propagating in the lightguide towards the outcoupler. The further reflector may be secured to the lightguide and may be disposed in an optical path of the third portion in the lightguide. The further reflector may be oriented relative to the lightguide to direct the further reflected beam along an optical path inside the lightguide that is about coincident with a corresponding optical path of the third portion inside the lightguide. The further reflector may be oriented relative to the lightguide to direct the further reflected beam along an optical path inside the lightguide that is offset from a corresponding optical path of the third portion inside the lightguide.

According to another implementation of the present disclosure there is provided an optical element comprising: a lightguide; an incoupler and an outcoupler each optically coupled to the lightguide: the incoupler to: receive a display beam incident upon the lightguide at a first incidence position; direct a first portion of the display beam into the lightguide to form an incoupled beam, the first portion propagating in the lightguide towards the outcoupler; direct a second portion of the display beam into the lightguide, the second portion propagating in the lightguide away from the outcoupler; and the outcoupler to: direct at least a corresponding portion of the incoupled beam out of the lightguide to form an outcoupled beam propagating towards an eye of a user to form an image viewable by the user; and a reflector optically coupled to the lightguide, the reflector to reflect the second portion back into the lightguide to form a reflected beam propagating in the lightguide towards the outcoupler.

The reflector may be secured to the lightguide and is disposed in an optical path of the second portion in the lightguide. The reflector may be oriented relative to the lightguide to direct the reflected beam along an optical path inside the lightguide that is about coincident with a corresponding optical path of the second portion inside the lightguide. The reflector may be oriented relative to the lightguide to direct the reflected beam along an optical path inside the lightguide that is offset from a corresponding optical path of the second portion inside the lightguide. The incoupler may be further to cause a third portion of the display beam to remain non-incoupled relative to the lightguide to form a non-incoupled beam; and the optical element may further comprise: a reflector to receive the non-incoupled beam and reflect the non-incoupled beam towards the incoupler to form a further reflected beam incident upon the incoupler at a second incidence position, the incoupler to direct a corresponding portion of the further reflected beam into the lightguide to form a further incoupled beam; and wherein the outcoupler is further to outcouple a corresponding portion of the further incoupled beam to form a further outcoupled beam propagating towards the eye of the user.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
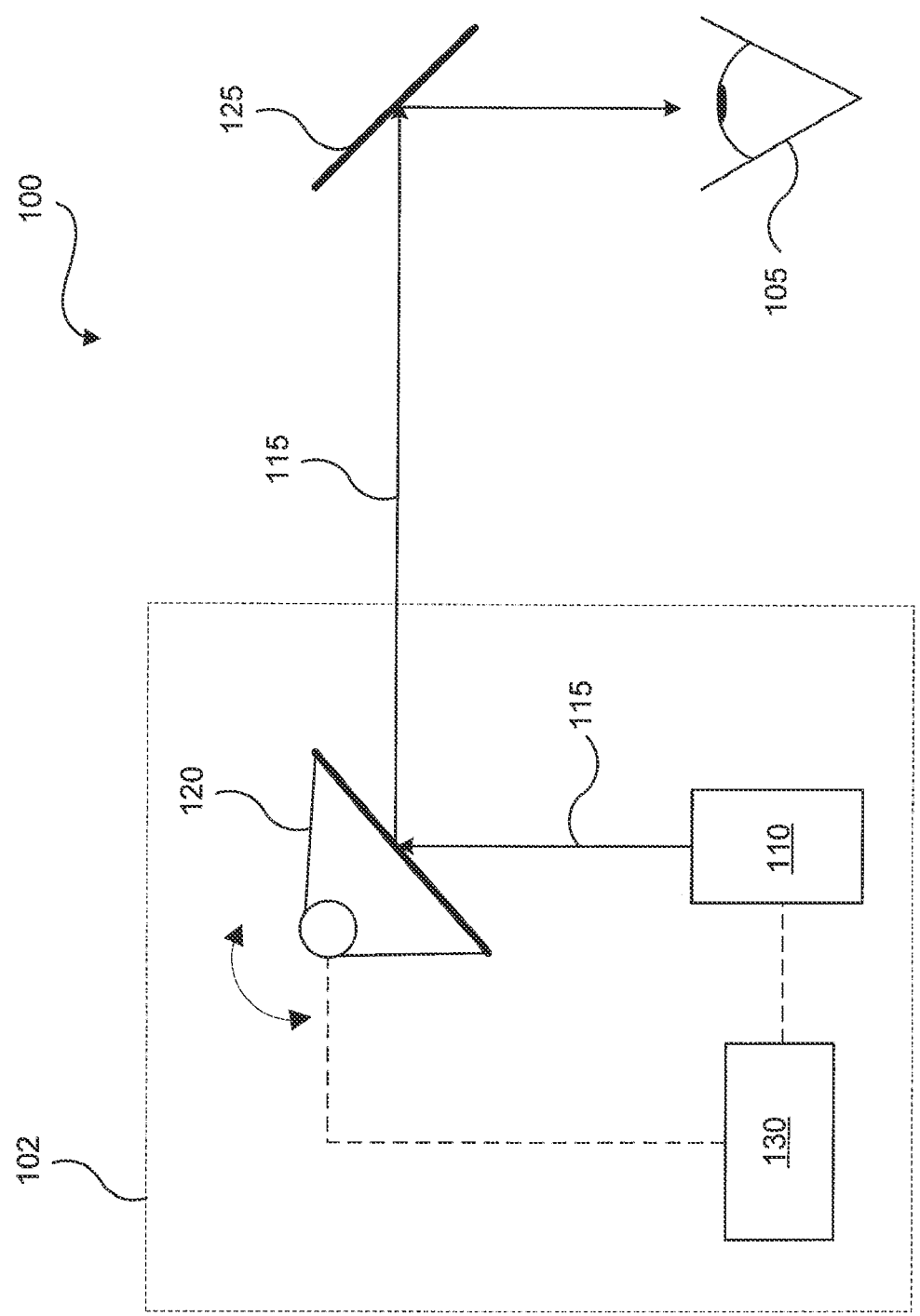
FIG. 1 shows a schematic representation of an example system which may be used to form or project an image, in accordance with an example implementation of the present disclosure.

In the following description, certain specific details are set forth to provide a thorough understanding of various disclosed implementations. However, one skilled in the relevant art will recognize that implementations may be practiced without one or more of these specific details, or with other methods, components, materials, and the like. In other instances, well-known structures associated with light sources have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is as "including, but not limited to." As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Throughout this specification and the appended claims, the term "carries" and variants such as "carried by" are generally used to refer to a physical coupling between two objects. The physical coupling may be direct physical coupling (i.e., with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, secured to, and/or supported by, with or without any number of intermediary physical objects therebetween.

In some examples, an optical element may comprise a lightguide and an incoupler (IC) optically coupled to the lightguide. In some examples, the IC may comprise a diffractive optical element, such as a surface relief grating (SRG), a hologram (e.g., a holographic optical element), or the like. The IC may receive a display beam generated by a light engine or other display light source of the display that incorporates the optical element. The IC then directs at least a portion of the display beam into the lightguide to form an incoupled beam. The incoupled beam then propagates within the lightguide. In some examples, the IC may cause a further portion of the display beam to remain un-incoupled relative to the lightguide to form a non-incoupled beam.

Furthermore, in some examples, the optical element also comprises an outcoupler (OC). The OC may also comprise a diffractive optical element such as a SRG, a hologram, and the like. The OC may be optically coupled to the lightguide. Once the incoupled beam propagating within the lightguide is incident upon the OC, the OC directs at least a portion of the incoupled beam out of the lightguide to form an outcoupled beam propagating towards an eye of a user of the display, so as to form an image viewable by the user. Example optical elements providing this aspect are described in greater detail in relation to FIGS. 3-21.

At least a portion of the incoupled beam propagates in the lightguide towards the OC. In some examples, the IC may cause a yet further portion of the display beam to be directed into the lightguide, but to propagate away from the OC. The portions of the display beam incident upon the IC which remain non-incoupled or propagate away from the OC may not be available to be used to form an image. As such, these portions may represent losses or inefficiencies in the operation of the optical element. In some example optical elements, a reflector may be used to direct the non-incoupled beam back towards the IC, to reduce such inefficiencies. Examples of such optical elements are described in relation to FIGS. 6-21. In addition, in some example optical elements, a reflector may be used to direct the beams propagating in the lightguide away from the OC back towards the OC, to reduce operating inefficiencies. Examples of such optical elements are described in relation to FIGS. 20-21.

Moreover, in color displays, the display beam may comprise beams of different colors. For example, the display beam may comprise red, green, and blue constituent beams. Different colors or combinations of colors may also be used. In some examples, the IC may direct each color beam of the display light into the lightguide at a different angle based on the color (that is, wavelength or frequency) of the beam. This, in turn, may cause the different color constituent beams of the display beam to have different bounce separations within the lightguide. As a result, beams with shorter bounce separations may become incident upon the OC at bounce positions that are more closely spaced apart compared to the incidence positions of beams with relatively longer bounce separations.

This difference between the spacings of the bounce positions of the different color beams on the OC may cause non-uniformities in the image displayed using the optical element. In some examples, such non-uniformities may include color balance non-uniformities. In some example optical elements, color beams corresponding to longer wavelengths may have a longer bounce separation in the lightguide (and correspondingly further spaced apart incidence positions on the OC) compared to color beams corresponding to relatively shorter wavelengths. This, in turn, may distort the color balance by favoring the colors of the color beams corresponding to the relatively shorter wavelengths, which may cause color balance non-uniformities in images formed using the display.

In order to reduce such image non-uniformities, the bounce separation (that is, the distance between two adjacent bounce positions within the lightguide) of one or more of the color beams corresponding to the longer wavelengths may be shortened, to bring these bounce separations closer to the bounce separations of the color beams corresponding to the relatively shorter wavelengths. FIGS. 10-12 and 21 show example optical elements in which the bounce separation of a color beam is shortened. In this description, shortening the bounce separation of a color beam refers to shortening the bounce separation within the lightguide of the incoupled beam corresponding to that color beam.

Turning now to FIG. 1, a schematic representation of an example system 100 is shown. System 100 may be used to form or project an image viewable by an eye 105 of a viewer. System 100 may also be referred to or described as an image projection device, a display device, a display system, or a display. The viewer may also be described as a user of system 100. System 100 may comprise a light engine 102 to generate a beam of output light 115. In some examples, light engine 102 may comprise a light source 110 to generate output light 115. Output light 115 may also be described as a display beam. In some examples, light engine 102 may generate a display beam comprising a plurality of different color beams. Such multi-color display beams may allow system 100 to form color images.

Moreover, in some examples, light source 110 may comprise at least one laser, at least one light emitting diode, and the like. Light engine 102 may also comprise a spatial modulator 120 to receive output light 115 from light source 110. In some examples, spatial modulator 120 may comprise a movable reflector, a micro-electro-mechanical system (MEMS), a digital micromirror device (DMD), and the like. In some examples, spatial modulator 120 may be part of a relay optic of system 100.

While FIG. 1 shows light engine 102 as comprising spatial modulator 120, in some examples light engine 102 need not comprise spatial modulator 120 or light source 110. In some examples, light engine 102 may comprise a microdisplay, or other light sources suitable for forming an image.

Furthermore, system 100 may comprise a display optic 125 to receive output light 115 from light engine 102 and direct the output light towards eye 105 of a user of the WHUD to form an image viewable by the user. In some examples, display optic 125 may comprise a lightguide and an IC optically coupled to the lightguide. Moreover, in some examples, display optic 125 may also comprise an OC optically coupled to the lightguide. Furthermore, in some examples the display optic may be, or may comprise, one or more of the optical elements described herein, such as the optical elements described in relation to FIGS. 6-21, and the like.

Moreover, in some examples system 100 may be a part of or incorporated into a wearable heads-up display (WHUD). Such a heads-up display may have different designs or form factors, such as the form factor of eyeglasses, as is described in greater detail in relation to FIG. 2. In examples where system 100 is in the form factor of glasses, display optic 125 may be on or in a lens of the glasses.

In addition, in some examples light engine 102 may comprise a controller 130 in communication with light source 110 and spatial modulator 120. Controller 130 may control light source 110 and spatial modulator 120 to project an image. In some examples, the image to be projected may be a still image, a moving image or video, an interactive image, a graphical user interface, and the like.

In some examples, the controllers described herein such as controller 130 may comprise a processor in communication with a non-transitory processor-readable medium. The processor-readable medium may comprise instructions to cause the processors to control the light source and the spatial modulator to form images viewable by the user of system 100. Moreover, in some examples the controllers may be free-standing components, while in other examples the controllers may comprise functional modules incorporated into other components of their respective systems.

Furthermore, in some examples the controllers or their functionality may be implemented in other ways, including: via Application Specific Integrated Circuits (ASICs), in standard integrated circuits, as one or more computer programs executed by one or more computers (e.g., as one or more programs running on one or more computer systems), as one or more programs executed by on one or more controllers (e.g., microcontrollers), as one or more programs executed by one or more processors (e.g., microprocessors, central processing units, graphical processing units), as firmware, and the like, or as a combination thereof.

Figure 2:
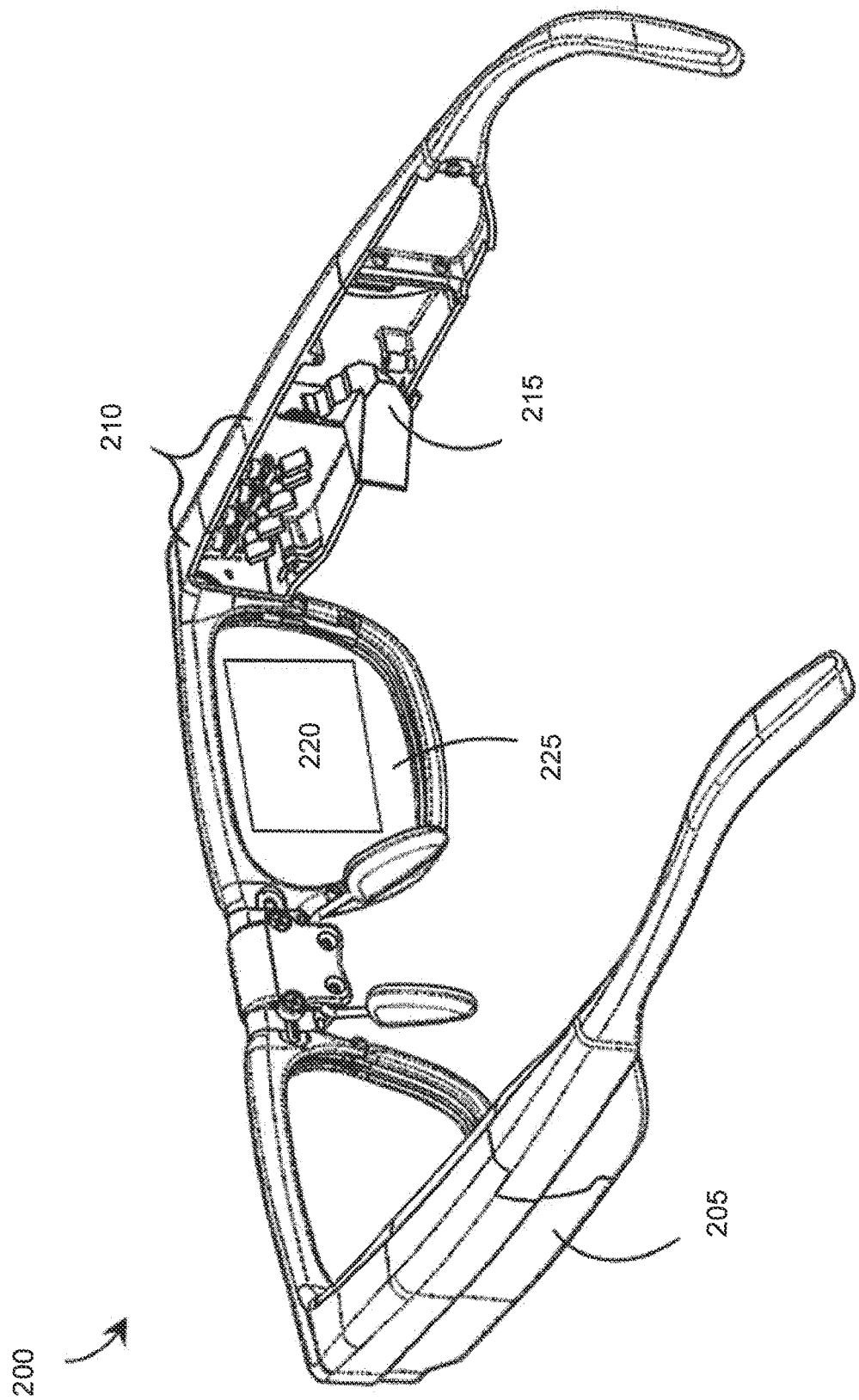
FIG. 2 shows a partial-cutaway perspective view of an example wearable heads-up display, in accordance with an example implementation of the present disclosure.

Turning now to FIG. 2, a partial-cutaway perspective view of an example wearable heads-up display (WHUD) 200 is shown. WHUD 200 includes a support structure 205 that in use is worn on the head of a user and has the general form factor and appearance of an eyeglasses (e.g. sunglasses) frame. Eyeglasses or sunglasses may also be generically referred to as "glasses". Support structure 205 may carry components of a system to display an image, such as system 100. For example, light engine 102 may be received in a space 210 in a side arm of support structure 205.

The spatial modulator of the systems described herein may be received in or be part of component 215 of support structure 205. The spatial modulator in turn may direct the output light onto a display optic 220 carried by a lens 225 of support structure 205. In some examples, display optic 220 may be similar in structure or function to display optic 125. Moreover, in some examples display optic 220 may be, or may comprise, one or more of the optical elements described herein, such as the optical elements described in relation to FIGS. 6-21, and the like.

Figure 3:
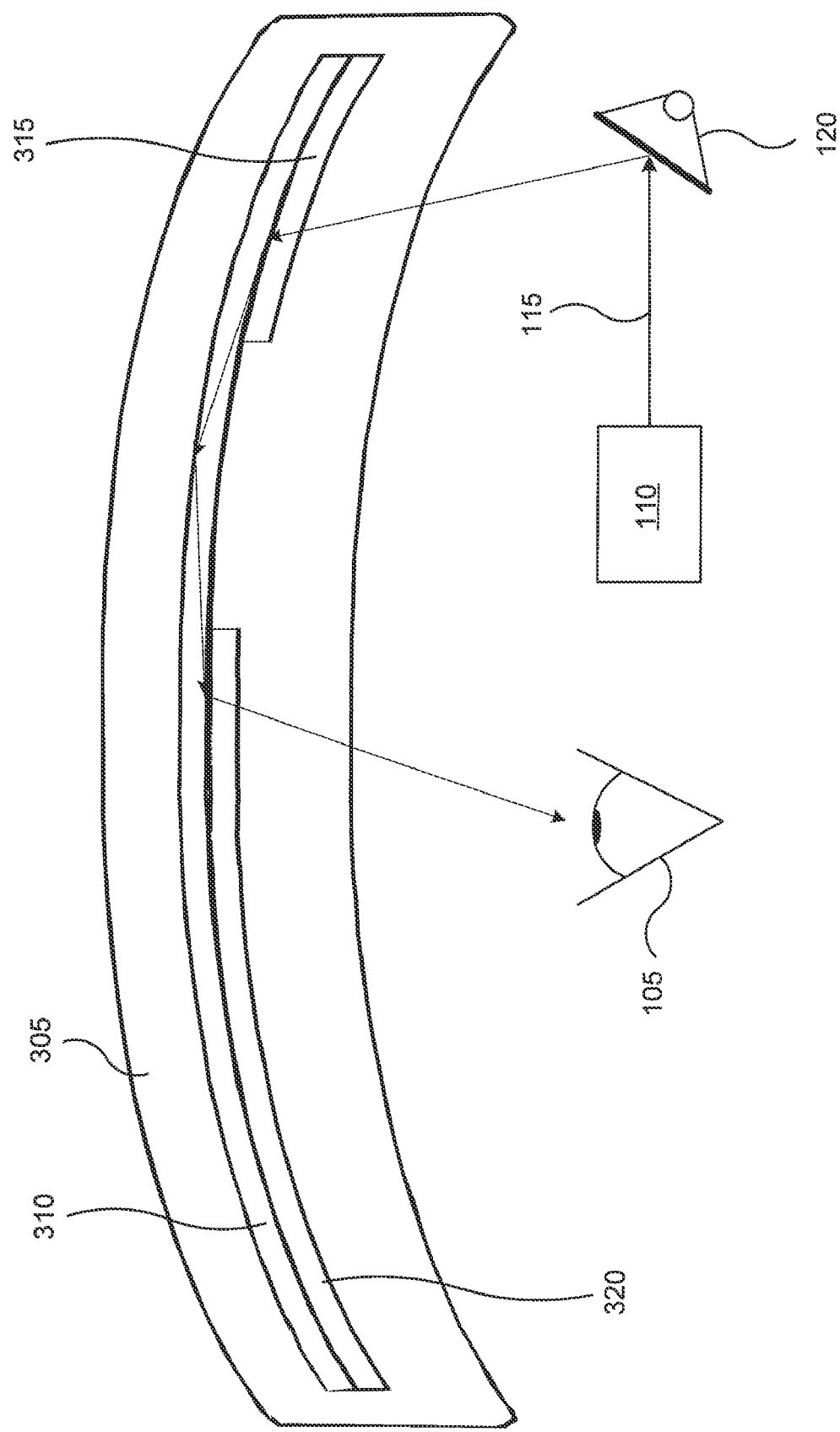
FIG. 3 shows a schematic cross-sectional representation of an example lens of an example wearable heads-up display, in accordance with an example implementation of the present disclosure.

Turning now to FIG. 3, a schematic cross-sectional representation is shown of an example lens 305 of an example WHUD. The components in FIG. 3 are not cross-hatched to allow for a clearer illustration of the path of an example ray of light traversing these components. In some examples, lens 305 may be used as lens 225 in WHUD 200. Lens 305 has embedded within it a display optic, which display optic may be, or comprise an optical element. In some examples, the optical element may comprise one or more of the optical elements described herein, such as the optical elements described in relation to FIGS. 6-21, and the like.

The optical element comprises a lightguide 310, and an IC 315 and an OC 320 affixed to, embedded in, or integrated with lightguide 310. IC 315 may direct at least a portion of output light 115 into lightguide 310 to form an incoupled beam. OC 320, in turn, may outcouple from lightguide 310 a portion of the incoupled beam to form an outcoupled beam propagating towards eye 105 of a viewer. While not shown in FIG. 3, in some examples, OC 320 may also act an exit pupil expander (EPE) and generate a plurality of exit pupils (EPs) that may enter eye 105 and become viewable by the user of the WHUD incorporating lens 305.

Moreover, in some examples, the display optic shown in FIG. 3 may be used as display optic 125 in system 100. In some examples, lightguide 310 may guide light within it using total internal reflection. IC 315 may receive an incoming beam of light, such as output light 115 generated by light source 110. IC 315 may then redirect output light 115 towards lightguide 310 at an angle that allows output light 115 to enter lightguide 310, and to travel through or within lightguide 310. Total internal reflection may prevent output light 115 from leaking from the walls of lightguide 310.

Once output light 115 that is travelling in lightguide 310 reaches and becomes incident upon OC 320, OC 320 may direct a portion of output light 115 out of lightguide 310 and towards eye 105 of a user. In some examples, the combination of lightguide 310, IC 315, and OC 320 may be described as an optical element. Such an optical element may be used as, or as a part of, display optic 125 in system 100 or display optic 220 in WHUD 200. In some examples, such optical elements may also comprise corresponding reflectors, as discussed in greater detail in relation to FIGS. 6-21.

Figure 4:
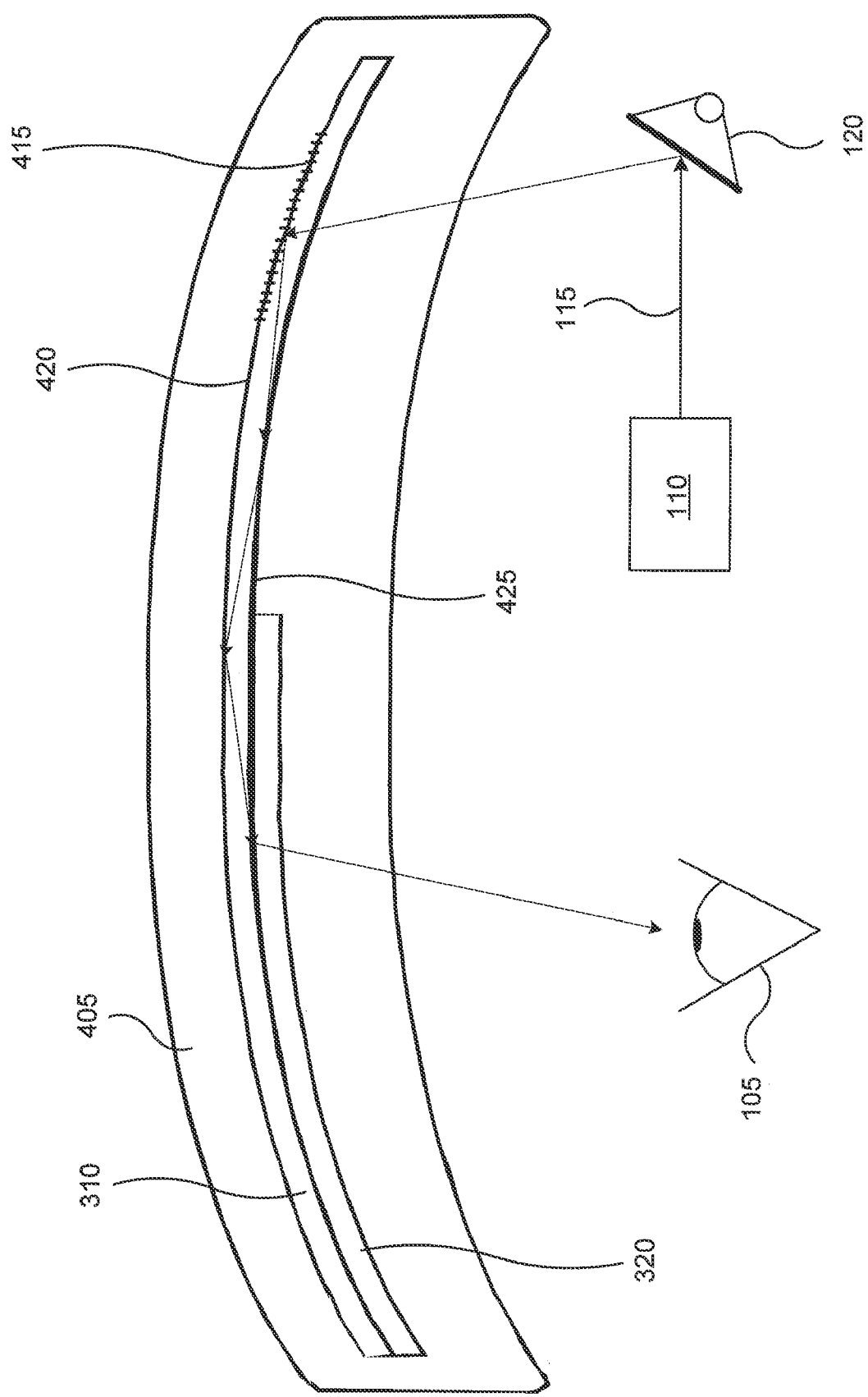
FIG. 4 shows a schematic cross-sectional representation of another example lens of an example wearable heads-up display, in accordance with an example implementation of the present disclosure.

FIG. 4, in turn, shows a schematic cross-sectional representation of an example lens 405 of an example WHUD. The components in FIG. 4 are not cross-hatched to allow for a clearer illustration of the path of an example ray of light traversing these components. Lens 405 may have a similar structure and function as lens 305. In addition, lens 405 may be used in similar displays or WHUDs as lens 305. A difference between lenses 405 and 305 is that in the optical element of lens 405 an IC 415 is disposed proximate a surface 420 of lightguide 310 opposite another surface 425 that carries OC 320. In this configuration, output light 115 propagating from spatial modulator 120 passes through lightguide 310 before becoming incident upon IC 415.

In some examples, IC 415 may comprise a diffractive optical element. Moreover, in some examples, IC 415 may comprise a hologram disposed proximate surface 420 of lightguide 310. Furthermore, in some examples, IC 415 may comprise a SRG at or near surface 420. In some examples, the OC may also comprise a diffractive optical element disposed at or near surface 420 of lightguide 310. In some examples, the combination of lightguide 310, IC 415, and OC 320 may be described as an optical element. The optical element of lens 405 may also be used as, or as a part of, display optic 125 in system 100 or display optic 220 in WHUD 200. In some examples, the optical element may comprise one or more of the optical elements described herein, such as the optical elements described in relation to FIGS. 6-21, and the like. Moreover, in some examples, such optical elements may also comprise corresponding reflectors, as discussed in greater detail in relation to FIGS. 6-21.

Figure 5:
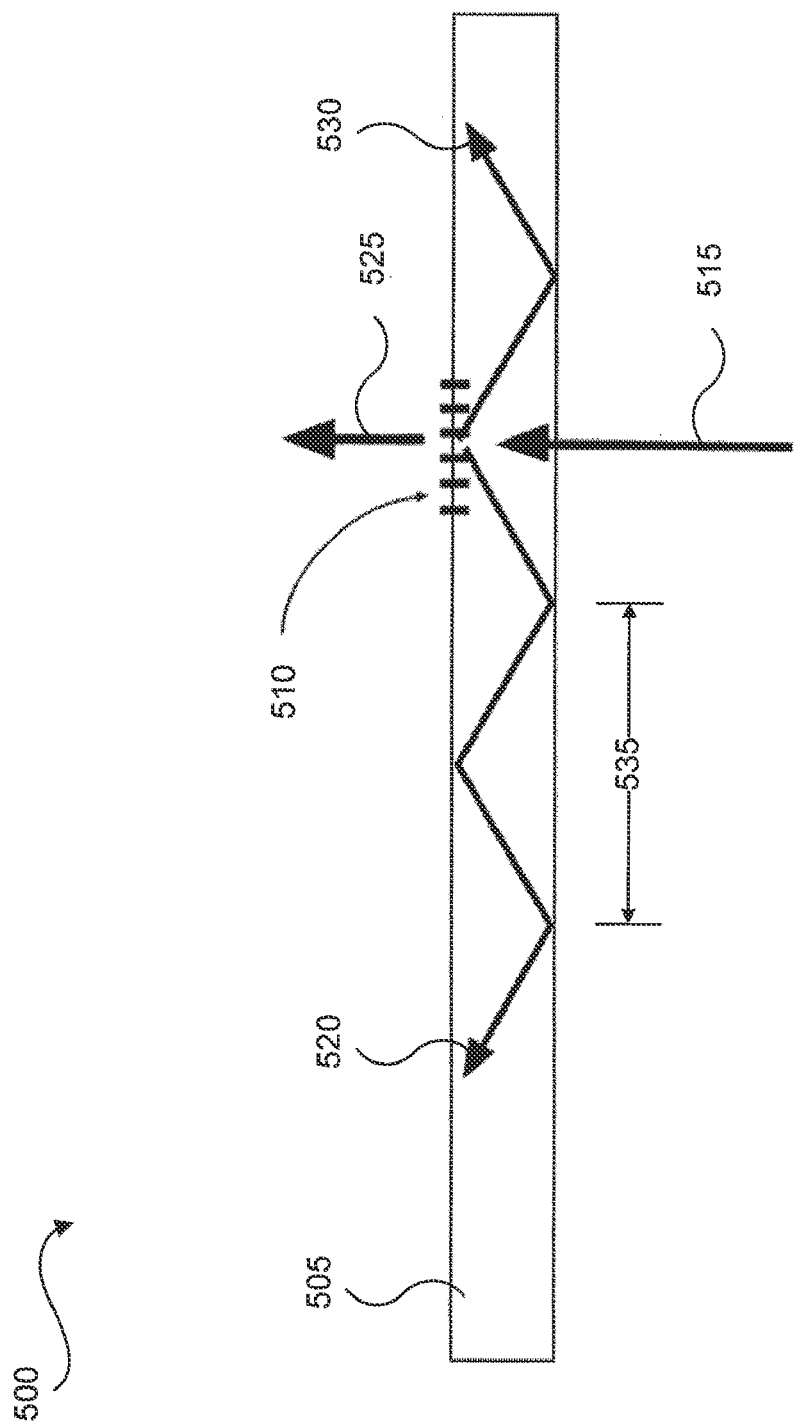
FIG. 5 shows a schematic, cross-sectional representation of an example optical element.

FIG. 5 shows a schematic cross-sectional representation of an example optical element 500. Optical element 500 comprises a lightguide 505 and an IC 510 optically coupled to lightguide 505. In some examples, lightguide 505 may comprise glass, an optical grade plastic, or other optical grade materials suitable for conducting light. Moreover, in some examples, IC 510 may comprise a diffractive optical element such as a SRG, a hologram, or the like. IC 510 may receive a display beam 515. In some examples, display beam 515 may be generated by a light engine (not shown in FIG. 5). IC 510 may then direct at least a portion of display beam 515 into lightguide 505 to form an incoupled beam 520.

IC 510 may cause a further portion of display beam 515 to remain non-incoupled relative to lightguide 505 to form a non-incoupled beam 525. In some examples, non-incoupled beam 525 may represent a portion of display beam 515 that is transmitted by IC 510. Moreover, in some examples, non-incoupled beam 525 may represent a portion of display beam 515 that is redirected by IC 510 at an angle that does not allow the redirected portion to enter into or continue propagating within lightguide 505. In some examples, IC 510 may cause a portion of display beam 515 to remain non-incoupled due to processes or mechanisms other than those associated with transmission or angle of redirection of the non-incoupled beam by IC 510.

While not shown in FIG. 5, in some examples optical element 500 may also comprise an OC optically coupled to lightguide 505. In some examples, this OC may be carried by lightguide 505. Similarly, while the optical elements shown in FIGS. 6-18 are shown without an OC, in some examples, these optical elements may also each comprise a corresponding OC optically coupled to, or carried by, their respective lightguides.

In some examples, IC 510 may cause a yet further portion 530 of display beam 515 to be incoupled into lightguide 505 and propagate in a direction away from the direction of propagation of the incoupled beam 520. Further portion 530 may also be referred to as beam 530. In some examples, incoupled beam 520 may propagate within the lightguide towards an OC of the optical element, whereas the further portion 530 may propagate within lightguide 505 away from the OC.

FIG. 5 also shows a bounce separation 535 of incoupled beam 520. As discussed above, in some examples bounce separation 535 may be a function of the color or wavelength of display beam 515. In some examples, a shorter wavelength display beam may have a shorter bounce separation and a relatively longer wavelength display beam may have a relatively longer bounce separation.

Figure 6:
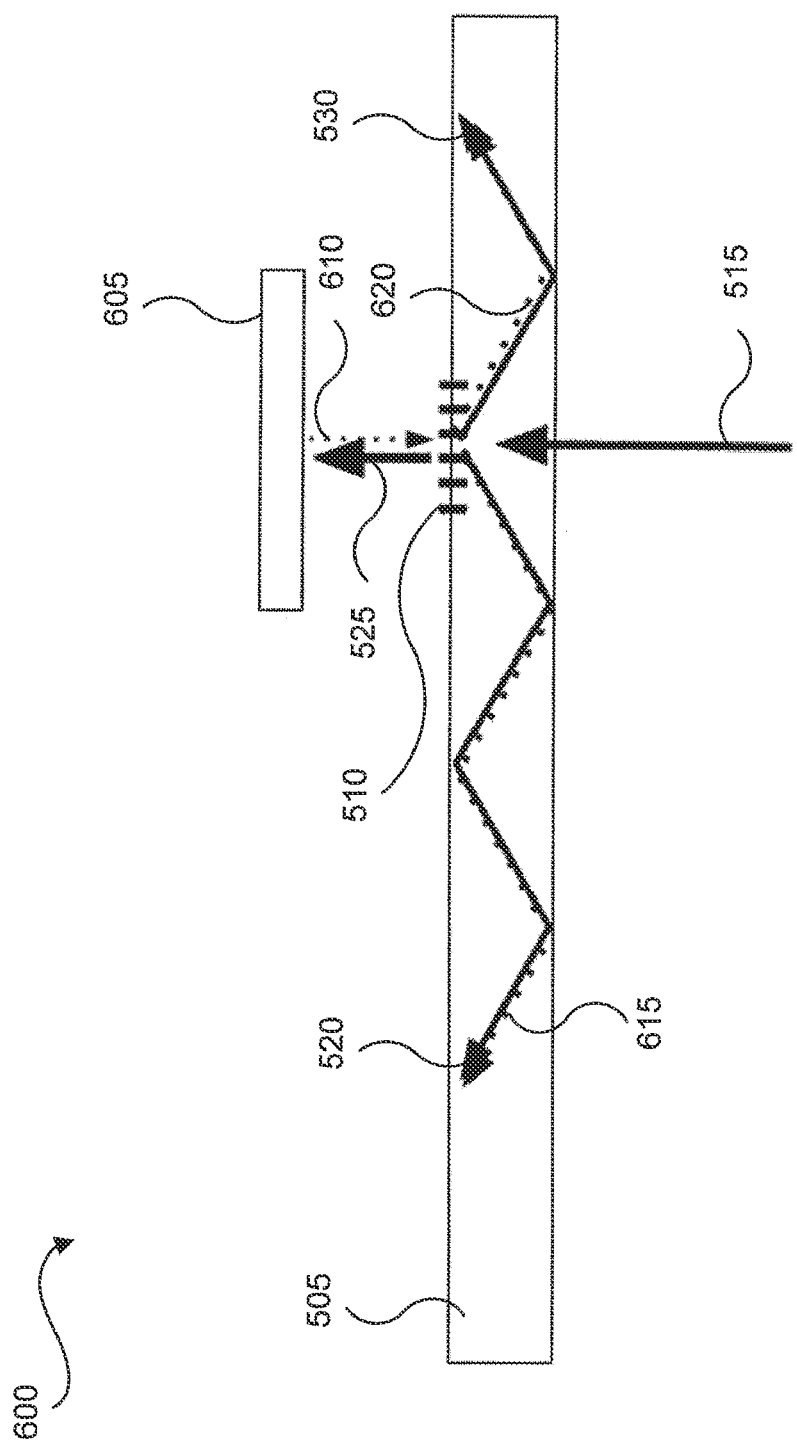
FIG. 6 shows a schematic, cross-sectional representation of another example optical element, in accordance with an example implementation of the present disclosure.

Turning now to FIG. 6, a schematic, cross-sectional representation of an example optical element 600 is shown. Optical element 600 comprises lightguide 505 and IC 510 optically coupled to lightguide 505. In addition, optical element 600 comprises a reflector 605 disposed in the optical path of non-incoupled beam 525. In some examples, reflector 605 may comprise a mirror, a reflective metalized layer, or the like. Moreover, in some examples, reflector 605 may comprise metallic mirrors, thin film mirrors, dichroics, beam splitters, or the like. While in FIG. 6 reflector 605 comprises a flat mirror, in some examples a reflector of the optical element may comprise different or additional optical components such as curved mirrors, prisms, lenses, diffractive optical elements, thin film layers, or the like.

Reflector 605 may receive non-incoupled beam 525 and reflect it towards IC 510 to form a reflected beam 610 incident upon IC 510 at a corresponding incidence position. In optical element 600, the incidence position of reflected beam 610 on IC 510 may be the same or substantially the same as the incidence position of display beam 515 on IC 510. In FIG. 6 non-incoupled beam 525 and reflected beam 610 are shown as two separate beams with offset incidence positions on IC 510 for clarity of illustration; non-incoupled beam 525 and reflected beam 610 may be coincident, and the respective incidence positions of reflected beam 610 and display beam 515 on IC 510 may be the same or substantially the same.

In some examples, reflected beam 610 need not be coincident with non-incoupled beam 525. In such examples, the incidence positions of display beam 515 and reflected beam 610 on IC 510 may be offset from one another. At least a portion of reflected beam 610 may then be incoupled into lightguide 505 by IC 510 to form a further incoupled beam 615. In addition, in some examples, a further portion of reflected beam 610 may be incoupled into lightguide 505 by IC 510 to form a further beam 620. In examples where non-incoupled beam 525 and reflected beam 610 are coincident, incoupled beam 520 and further incoupled beam 615 may also be coincident with one another. In addition, portions or beams 530 and 620 may also be coincident with one another.

In optical element 600 at least a portion of non-incoupled beam 525 (via reflected beam 610) may become incident upon IC 510 and may be incoupled into lightguide 505 to form incoupled beam 615, to supplement incoupled beam 520. By recovering or recapturing at least a portion of non-incoupled beam 525, optical element 600 may increase the efficiency of capturing or incoupling display beam 515 to form incoupled beams 520 and 615, which incoupled beams may then be outcoupled from lightguide 505 to form outcoupled beams used to form images viewable by a user.

Figure 7:
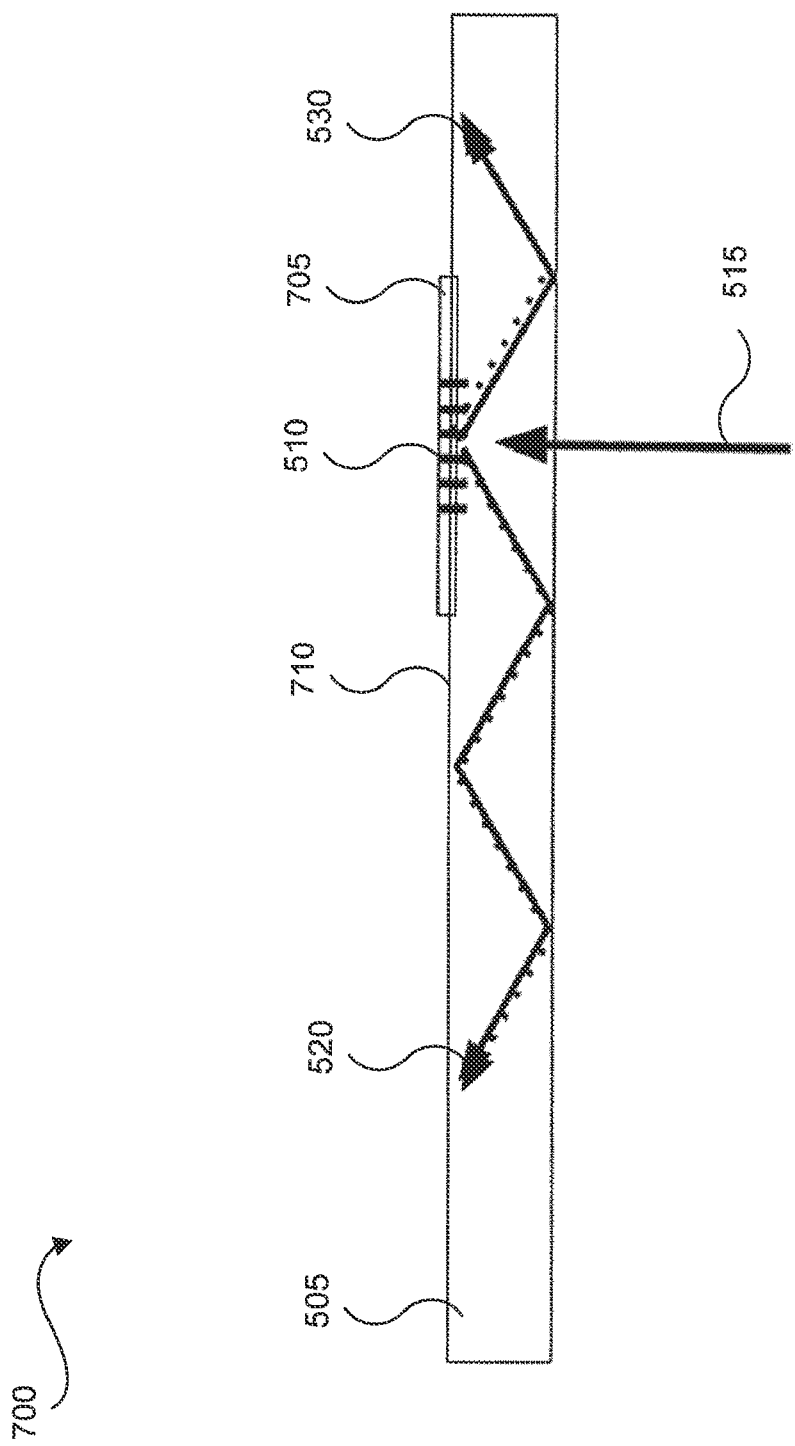
FIG. 7 shows a schematic, cross-sectional representation of yet another example optical element, in accordance with an example implementation of the present disclosure.

FIG. 7 shows a schematic, cross-sectional representation of an example optical element 700. Optical element 700 comprises lightguide 505 and IC 510 optically coupled to lightguide 505. In addition, optical element 700 comprises a reflector 705, which reflector 705 comprises a reflector disposed on a surface 710 of lightguide 505. Surface 710 may be the same surface at or near which IC 510 is disposed. In some examples, reflector 705 may comprise a reflective metalized layer, and the like. Optical element 700 may function in a manner similar to optical element 600.

Figure 8:
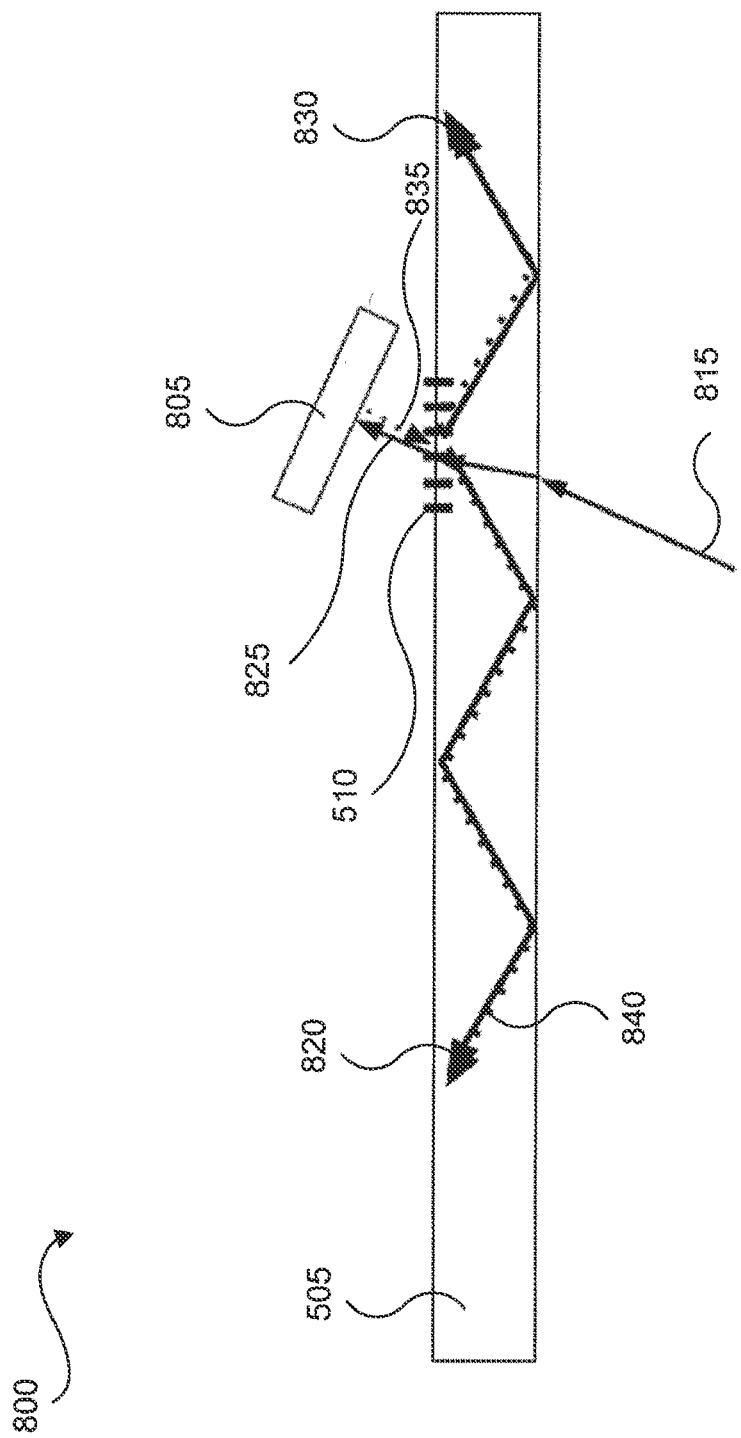
FIG. 8 shows a schematic, cross-sectional representation of yet another example optical element, in accordance with an example implementation of the present disclosure.

FIG. 8, in turn, shows a schematic, cross-sectional representation of an example optical element 800. Optical element 800 may be similar to optical element 600. Optical element 800 comprises lightguide 505, IC 510, and a reflector 805. Reflector 805 comprises a flat reflector. Reflector 805 may be similar in structure or function to reflector 605. A difference between optical elements 800 and 600 is that the orientation of reflector 805 relative to lightguide 505 is different than the corresponding orientation of reflector 605 relative to lightguide 505.

Optical element 800 may receive a display beam 815 that is at an angle to IC 510 other than a right angle. In such examples, a non-incoupled beam 825 may also be transmitted by IC 510, which non-incoupled beam 825 may also be non-orthogonal relative to IC 510. Reflector 805 may be oriented such that non-incoupled beam 825 is about orthogonal to reflector 805. This orientation may allow reflector 805 to reflect non-incoupled beam 825 back towards IC 510 to form a reflected beam 835 that is about coincident with non-incoupled beam 825.

IC 510 may direct at least a portion of display beam 815 into lightguide 505 to form incoupled beam 820. IC 510 may direct another portion of display beam 815 into lightguide 505 to form beam 830. Moreover, IC 510 may also direct a portion of reflected beam 835 into lightguide 505 to form a further incoupled beam 840.

Figure 9:
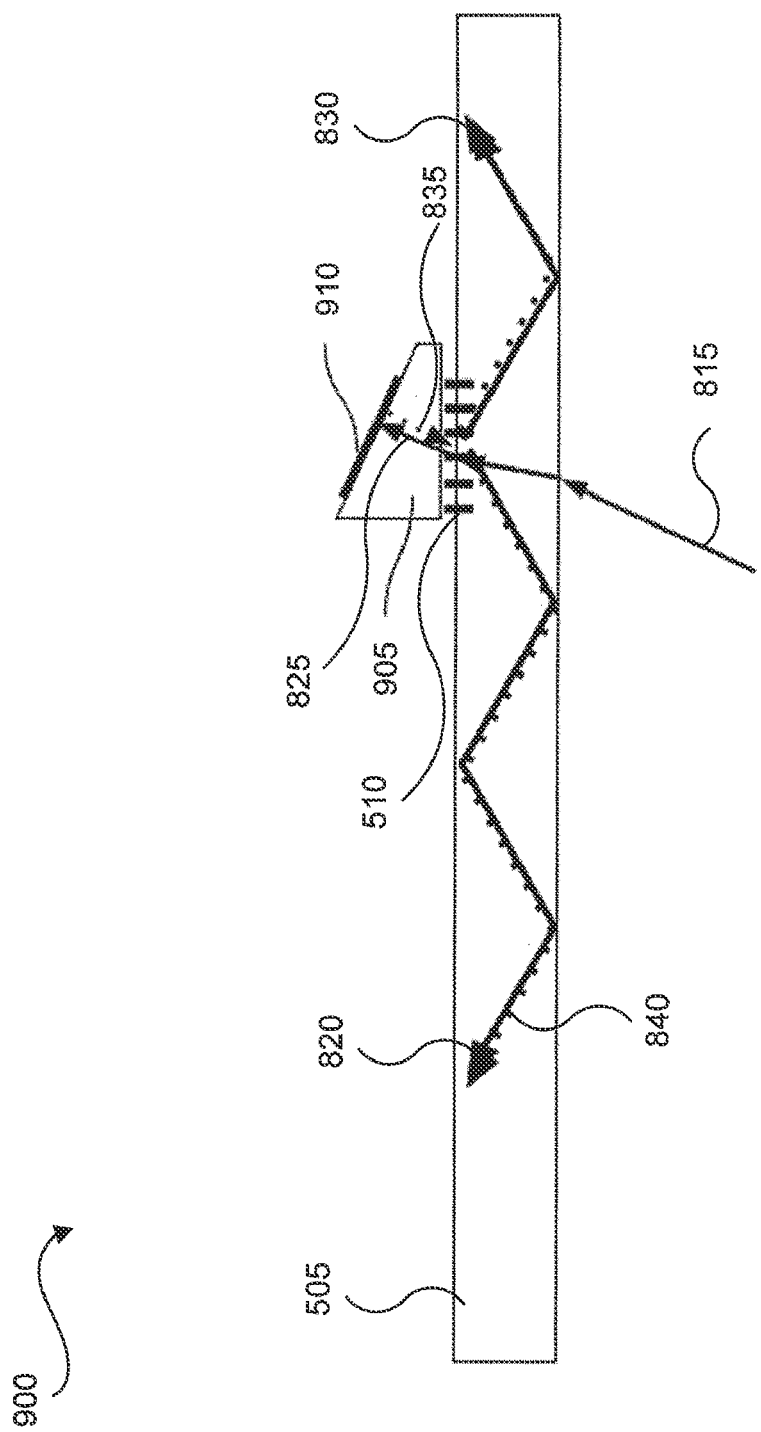
FIG. 9 shows a schematic, cross-sectional representation of yet another example optical element, in accordance with an example implementation of the present disclosure.

Turning now to FIG. 9, a schematic, cross-sectional representation is shown of an example optical element 900. Optical element 900 may be similar to optical element 800. A difference between optical elements 900 and 800 is that the reflector in optical element 900 comprises a prism 905 optically coupled to IC 510. In optical element 900, prism 905 is secured to lightguide 505. In some examples the prism may be spaced from the lightguide, or may be optically coupled to IC 510 using one or more intermediary optical materials or components. Examples of such optical materials or components may include optical grade adhesives, lightguides, and the like.

Prism 905 comprises a reflective side 910, which reflective side 910 reflects non-incoupled beam 825 back towards IC 510 to form reflected beam 835. In some examples, reflective side 910 may be metallized, or rendered reflective using other suitable techniques. While FIG. 9 shows reflective side 910 as being flat, in some examples, reflective side 910 may be curved. In some examples, reflective side 910 may be curved to reduce a divergence of non-incoupled beam 825. Moreover, in some examples, reflective side 910 may comprise a concave reflector.

Securing prism 905 to lightguide 505 may increase the mechanical strength or integrity of optical element 900. In addition, securing prism 905 to lightguide 505 may facilitate mechanically and optically aligning reflective side 910 relative to IC 510 during the assembly of optical element 900, and may also increase the likelihood of this alignment being maintained during the operation of optical element 900 and displays or WHUDs that may incorporate optical element 900.

Figure 10:
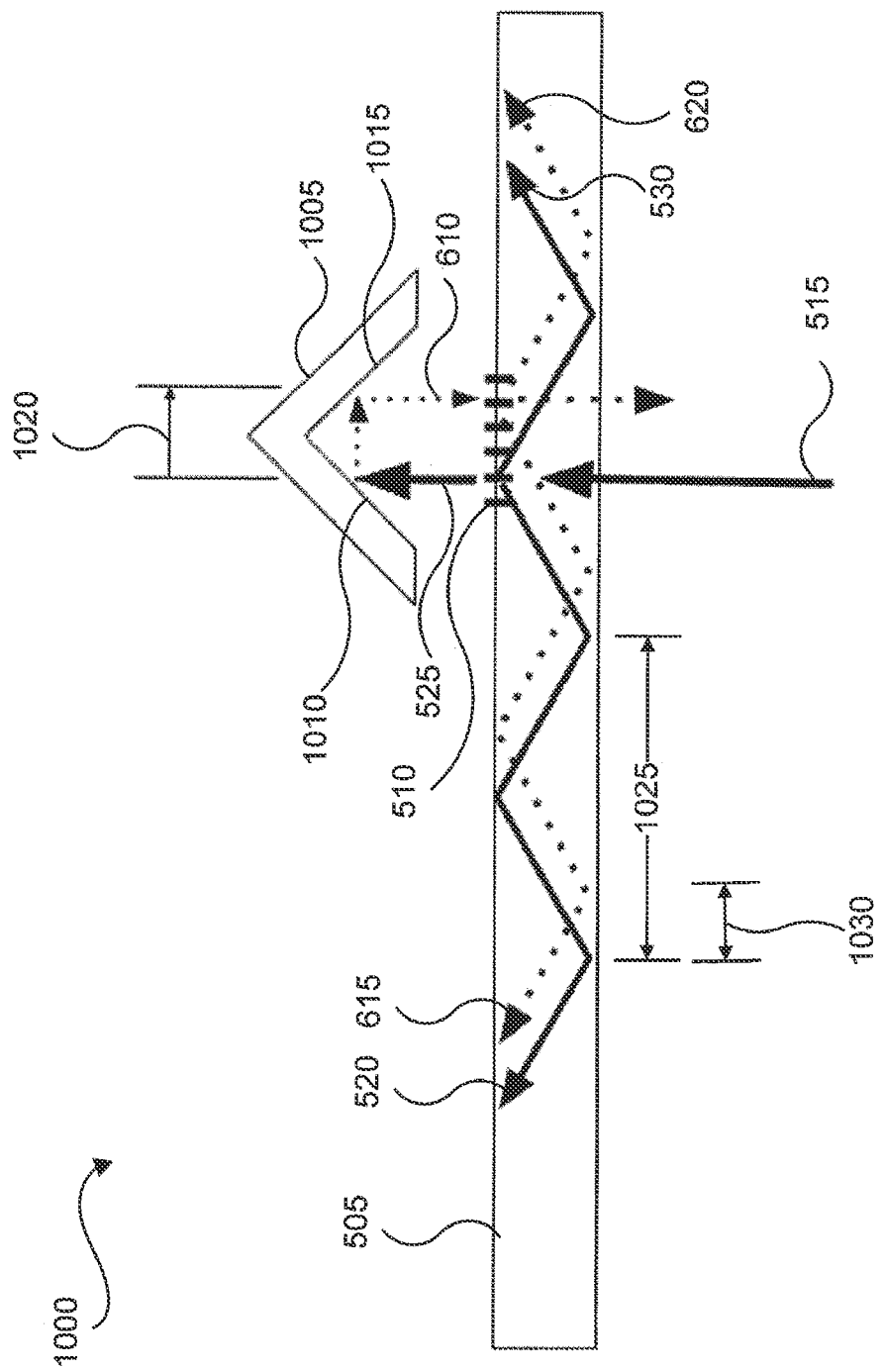
FIG. 10 shows a schematic, cross-sectional representation of yet another example optical element, in accordance with an example implementation of the present disclosure.

FIG. 10, in turn, shows a schematic, cross-sectional representation of an example optical element 1000. Optical element 1000 may be similar to optical element 600. A difference between optical elements 1000 and 600 is that optical element 1000 comprises a reflector 1005 which is shaped as a chevron or an inverted "V". Reflector 1005 may comprise two reflective surfaces or sides 1010 and 1015. Non-incoupled beam 525 may be incident upon reflective side 1010, which then directs non-incoupled beam 525 towards reflective side 1015. Reflective side 1015, in turn, directs non-incoupled beam 525 towards IC 510 to form reflected beam 610. The geometry of reflector 1005 allows the incidence position of reflected beam 610 on IC 510 to be offset or spaced from the incidence position of display beam 515 on IC 510 by a distance 1020.

While FIG. 10 shows a chevron-shaped reflector, in some examples reflectors with different shapes or geometries may be used to direct the non-incoupled beam back towards the IC such that the incidence position of the reflected beam on the IC is spaced or offset from the incidence position of the display beam on the IC.

As shown in FIG. 10, a portion of display beam 515 is incoupled into lightguide 505 to form incoupled beam 520. A second portion of display beam 515 (via non-incoupled beam 525 and reflected beam 610) is also incoupled into lightguide 505 to form further incoupled beam 615. As such, incoupled beams 520 and 615 may be referred to as offspring incoupled beams of display beam 515.

Incoupled beam 520 has a bounce separation 1025 in lightguide 505. Offsetting the incidence positions of display beam 515 and reflected beam 610 on IC 510 causes the respective bounce positions of incoupled beams 520 and 615 inside lightguide 505 to be offset relative to one another. This offsetting the respective bounce positions of incoupled beams 520 and 615 may cause the offspring incoupled beams of display beam 515 to have an bounce separation 1030 in lightguide 505. In some examples, bounce separation may be defined as the distance along the lightguide between successive bounce positions of incoupled offspring beams of a given display beam.

While distance 1020 is a non-integer multiple of bounce separation 1025, the respective bounce positions of beams 520 and 615 may be offset from one another, thereby shortening the bounce separation of the offspring incoupled beams of display beam 515. Moreover, as shown in FIG. 10, bounce separation 1030 is shortened compared to bounce separation 1025. This shortening of the bounce separation, in turn, may reduce image non-uniformities in images formed using optical element 1000. In some examples, such reduced image non-uniformities may include color balance non-uniformities caused by wavelength- or color-dependent variations among the bounce separations of the various color constituent beams of a given display beam.

For example, such shortening of the bounce separation may be applied to color constituent beams with longer wavelengths (and correspondingly longer bounce separations) to bring their bounce separations closer to the bounce separations of the color constituent beams with shorter wavelengths (and correspondingly shorter bounce separations). In this manner the difference between the bounce separations of the color constituent beams with shorter wavelengths and the bounce separations of the color constituent beams with relatively longer wavelengths may be reduced, which reduction in turn may reduce color balance non-uniformities in images formed using optical element 1000.

Figure 11:
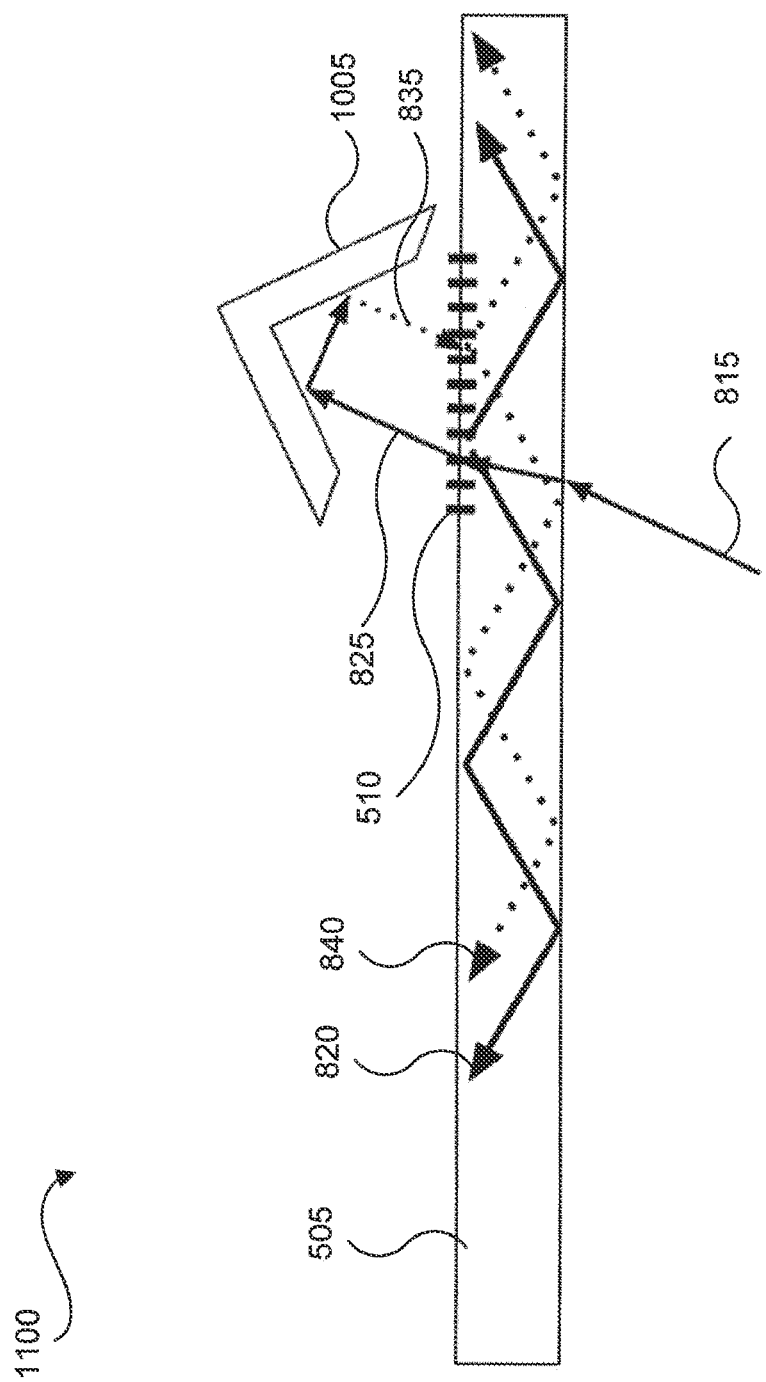
FIG. 11 shows a schematic, cross-sectional representation of yet another example optical element, in accordance with an example implementation of the present disclosure.

Turning now to FIG. 11, a schematic, cross-sectional representation is shown of an example optical element 1100. Optical element 1100 may be similar to optical element 800. A difference between optical elements 1100 and 800 is that optical element 1100 comprises reflector 1005, which causes the incidence position of reflected beam 835 on IC 510 to be offset from the incidence position of the display beam on IC 510. Similar to optical element 1000 (shown in FIG. 10), this offsetting of the incidence positions may offset the bounce positions of incoupled beams 820 and 840 in lightguide 505, thereby shortening the bounce separation of the incoupled offspring beams of display beam 815.

Figure 12:
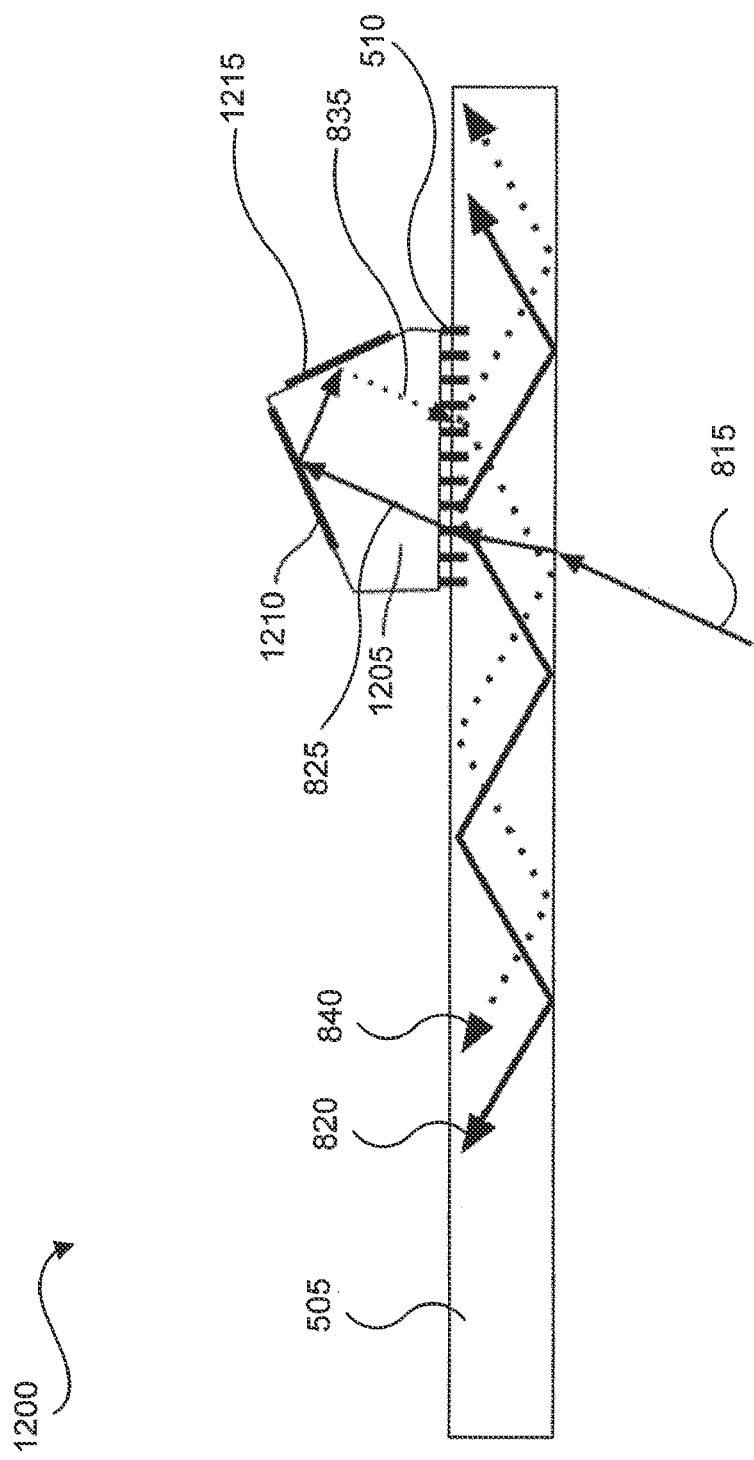
FIG. 12 shows a schematic, cross-sectional representation of yet another example optical element, in accordance with an example implementation of the present disclosure.

FIG. 12, in turn, shows a schematic, cross-sectional representation of an example optical element 1200. Optical element 1200 may be similar to optical element 1100. A difference between optical elements 1200 and 1100 is that in optical element 1200 the reflector comprises a prism 1205 optically coupled to IC 510. In some examples, prism 1205 may be secured to IC 510 or lightguide 505. Prism 1205 may comprise reflective sides 1210 and 1215. Reflective sides 1210 and 1215 may function in a manner similar to reflective sides 1010 and 1015 of reflector 1005 (shown in FIG. 10).

In some examples, one or more of reflective sides 1210 and 1215 may reflect non-incoupled beam 825 using total internal reflection. Moreover, in some examples, one or more of reflective sides 1210 and 1215 may comprise a metalized reflective layer, a diffractive optical element, and the like. While FIG. 12 shows reflective sides 1210 and 1215 as being flat, in some examples, one or more of reflective sides 1210 and 1215 may be curved. In some examples, one or more of reflective sides 1210 and 1215 may be curved to reduce a divergence of non-incoupled beam 825. Moreover, in some examples, one or more of reflective sides 1210 and 1215 may comprise a concave reflector.

Figure 13:
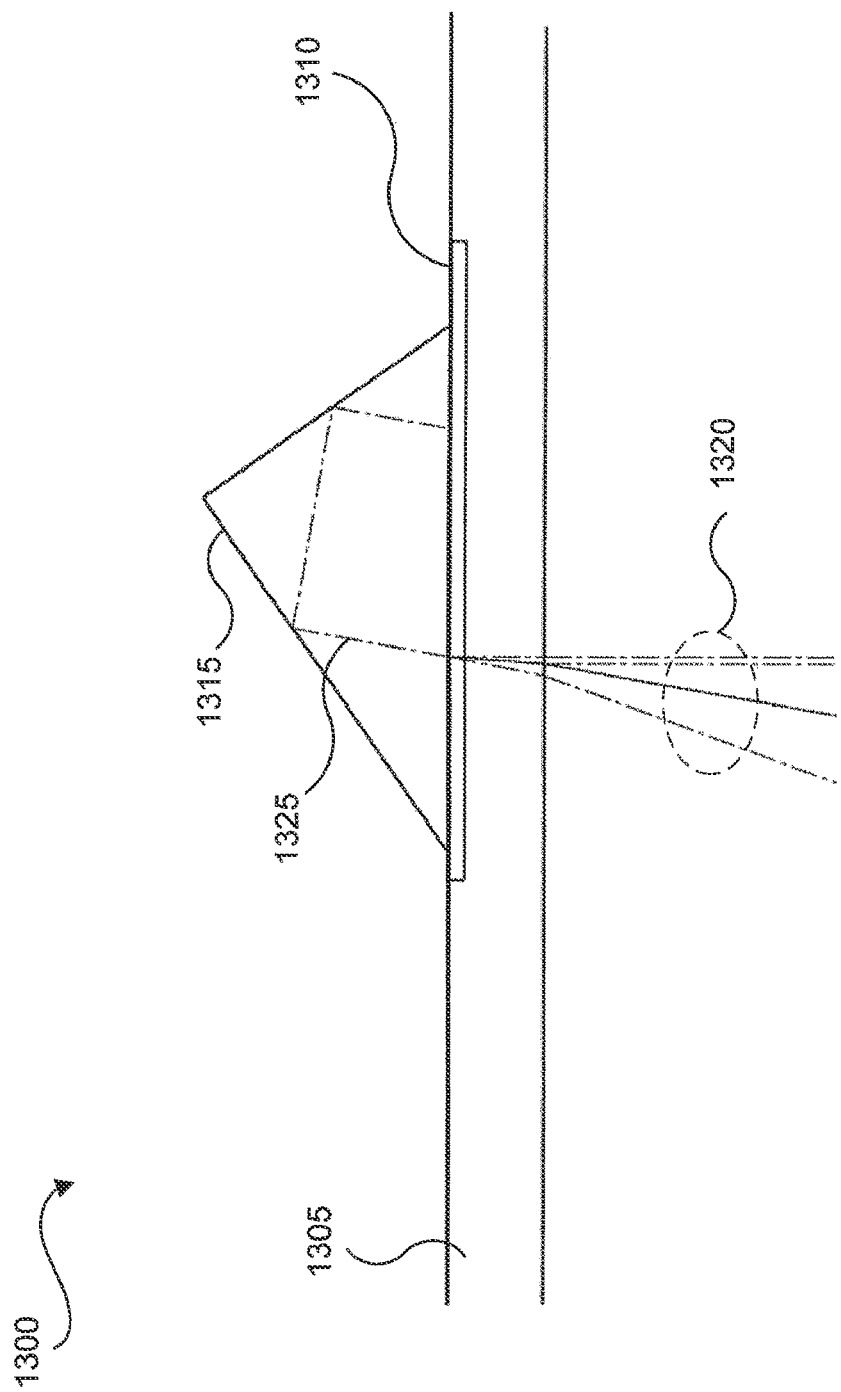
FIG. 13 shows a schematic, cross-sectional representation of yet another example optical element, in accordance with an example implementation of the present disclosure.

FIG. 13 shows a schematic, cross-sectional representation of an example optical element 1300, which comprises a lightguide 1305 and an IC 1310 optically coupled to lightguide 1305. Lightguide 1305 and IC 1310 may be similar to lightguide 505 and IC 510 respectively. Optical element 1300 also comprises a reflector 1315 optically coupled to IC 1310. Reflector 1315 may comprise two reflective sides, similar to reflectors 1005 and 1205. IC 1310 may receive a display beam 1320, which may comprise a plurality of color constituent beams. A representative non-incoupled beam 1325 corresponding to one of this plurality of color constituent beams is also shown in FIG. 13. FIG. 13 also shows that the plurality of the color constituent beams may be oriented to be focused or about convergent at the incidence position of display beam 1320 on IC 1310.

Figure 14:
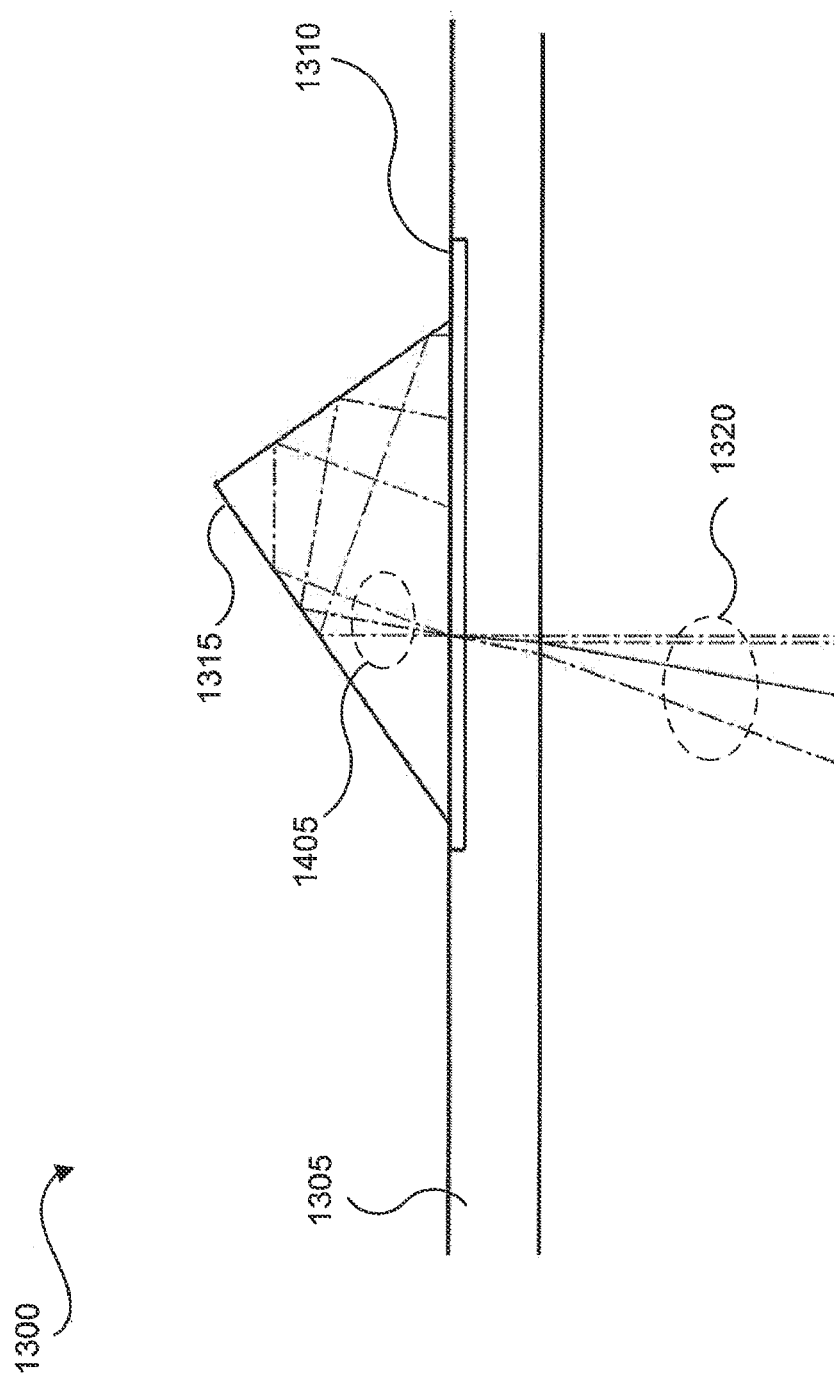
FIG. 14 shows a schematic, cross-sectional representation of yet another example optical element, in accordance with an example implementation of the present disclosure.

FIG. 14 shows another schematic, cross-sectional representation of optical element 1300. FIG. 14 shows that two or more of the color constituent beams of display beam 1320 may have corresponding non-incoupled beams 1405. As shown in FIG. 14, these non-incoupled beams 1405 may continue to diverge as they reflect from the reflective sides of reflector 1315 to generate corresponding reflected beams. As a result, when these reflected beams become incident upon IC 1310, they may have a larger divergence or beam diameter compared to the divergence or beam diameter of display beam 1320 at IC 1310.

To reduce or counteract this increase in divergence of the reflected beams, in some examples, the reflector may also comprise a divergence-reducing element disposed in the optical path of at least one of the non-incoupled beams and the reflected beams between the IC and the reflector. This divergence-reducing element may reduce the divergence of the one or more of the non-incoupled beam and the reflected beam. In some examples, the divergence-reducing element may comprise a concave reflector, a lens, and the like.

For a beam that is divergent, reducing the divergence may comprise making the beam less divergent, collimating the beam, or making the beam convergent. For a collimated beam, reducing the divergence may comprise making the beam convergent. For a beam that is convergent, reducing the divergence may comprise making the beam more tightly convergent, i.e. shortening the distance to the convergence point or the focal point.

Figure 15:
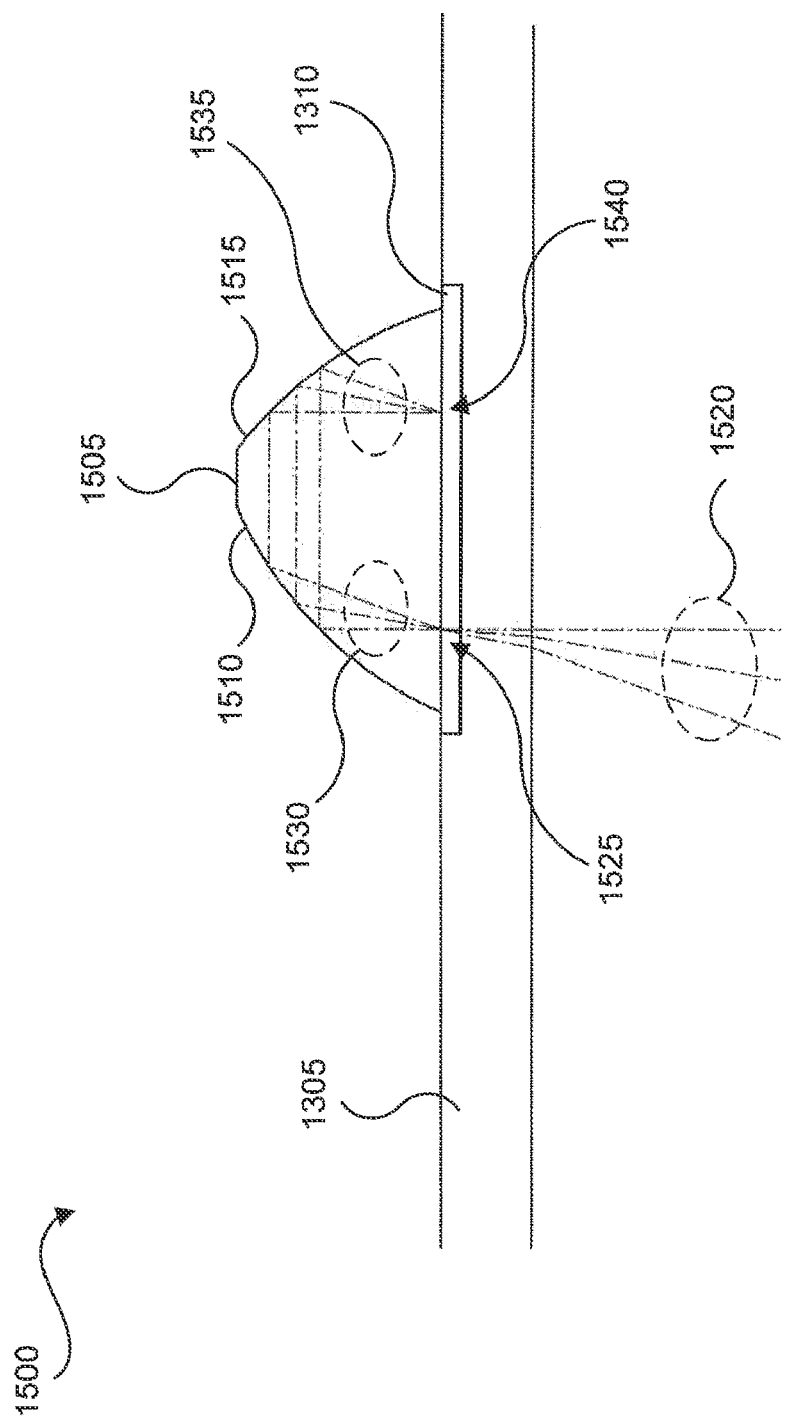
FIG. 15 shows a schematic, cross-sectional representation of yet another example optical element, in accordance with an example implementation of the present disclosure.

Turning now to FIG. 15, a schematic, cross-sectional representation is shown of an example optical element 1500. Optical element 1500 may be similar to optical element 1300. A difference between optical elements 1500 and 1300 is that optical element 1500 comprises a reflector 1505, which reflector 1505 comprises two curved, concave reflective sides 1510 and 1515.

In optical element 1500, IC 1310 may receive display beam 1520, which becomes incident on IC 1310 at incidence position 1525. Display beam 1520 may comprise a plurality of constituent beams. In some examples, these constituent beams may comprise constituent beams of different colors. Constituent beams of different colors may also be referred to as color constituent beams. Display beam 1520 may have a given diameter or convergence at incidence position 1525. In some examples, the constituent beams of display beam 1520 may be focused at incidence position 1525.

IC 1310 may cause a portion of one or more of the constituent beams of display beam 1520 to remain non-incoupled to form non-incoupled beams 1530. The constituent beams of non-incoupled beams 1530 may be divergent. Reflective sides 1510 and 1515 may direct non-incoupled beams back towards IC 1310 to form reflected beams 1535. Reflective sides 1510 and 1515 may cooperate to reduce the divergence of non-incoupled beams 1530 and reflected beams 1535. Reflected beams 1535 may become incident upon IC 1310 at incidence position 1540.

In some examples, reflective sides 1510 and 1515 may cooperate to adjust the divergence of reflected beam 1535 at incidence position 1540 to be substantially the same as the divergence of display beam 1520 at incidence position 1525. In this manner, while reflector 1505 recycles at least a portion of non-incoupled beams 1530, the divergence-reducing, curved reflective sides 1510 and 1515 prevent or reduce additional beam divergence that may be introduced by the recycling of the non-incoupled beams.

In some examples, the curved reflective sides 1510 and 1515 may also constitute or be referred to as the divergence-reducing element of reflector 1505. Moreover, while FIG. 15 shows both reflective sides 1510 and 1515 as being curved, in some examples one of the reflective sides 1510 and 1515 may be curved. Furthermore, in some examples, reflector 1505 may comprise a prism, and reflective sides 1510 and 1515 may be sides of that prism.

Figure 16:
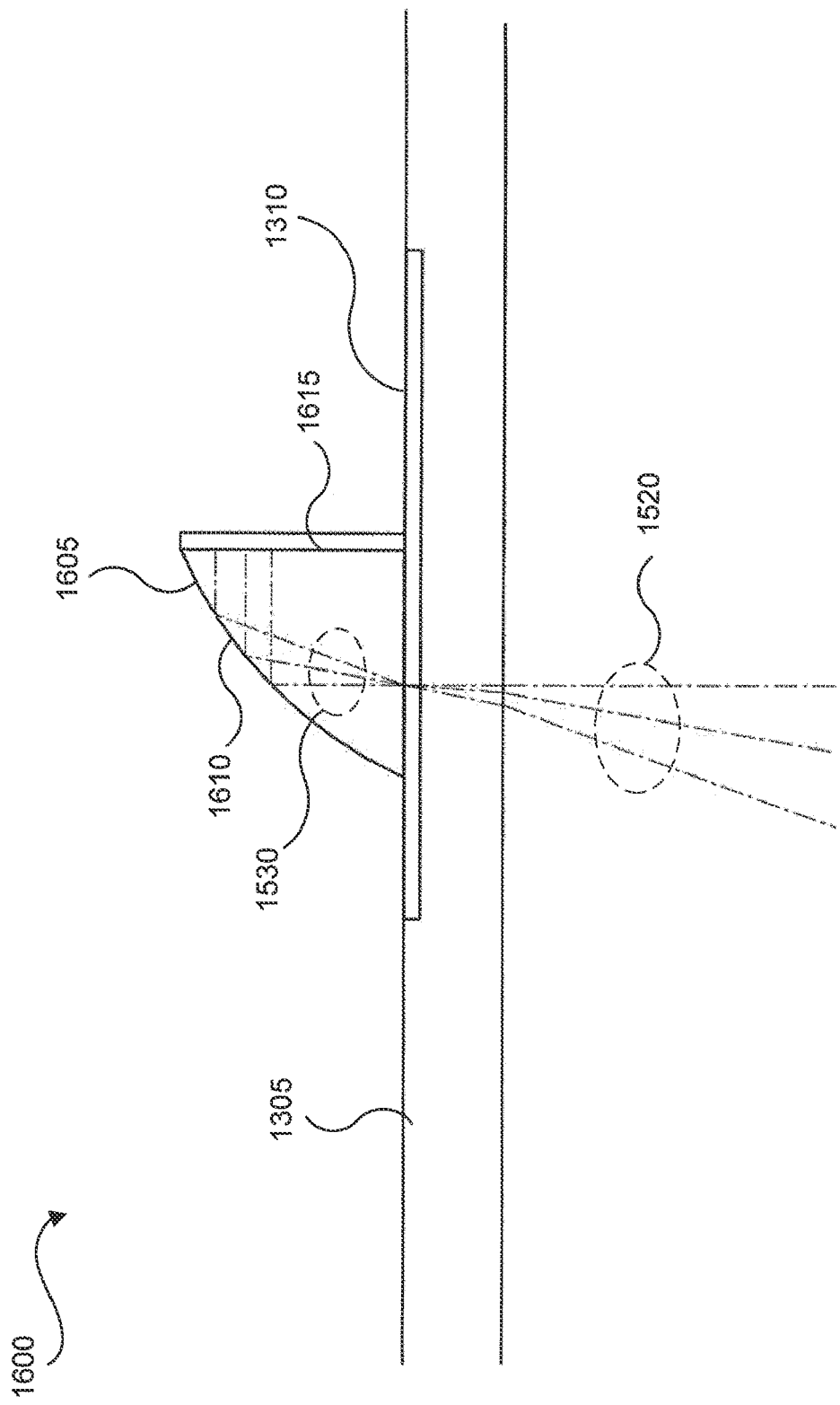
FIG. 16 shows a schematic, cross-sectional representation of yet another example optical element, in accordance with an example implementation of the present disclosure.

Turning now to FIG. 16, a schematic, cross-sectional representation is shown of an example optical element 1600. Optical element 1600 may be similar to optical element 1500. A difference between optical elements 1600 and 1500 is that optical element 1600 comprises a reflector 1605 having a curved reflective side 1610 and a flat reflective side 1615. Non-incoupled beams 1530 are incident upon reflective side 1610, which then directs them towards reflective side 1615. Reflective side 1615, in turn, directs the non-incoupled beams back towards reflective side 1610, which reflective side 1610, in turn, directs the beams back towards IC 1310 to form reflected beams.

Reflective side 1610 is concave to reduce the divergence of non-incoupled beams 1530 both on their way to reflective side 1615 and on their way from reflective side 1615. In some examples, reflector 1605 may comprise a prism. In some examples reflector 1605 need not comprise a prism, and may comprise two reflective sides 1610 and 1615 in optical communication with one another.

Figure 17:
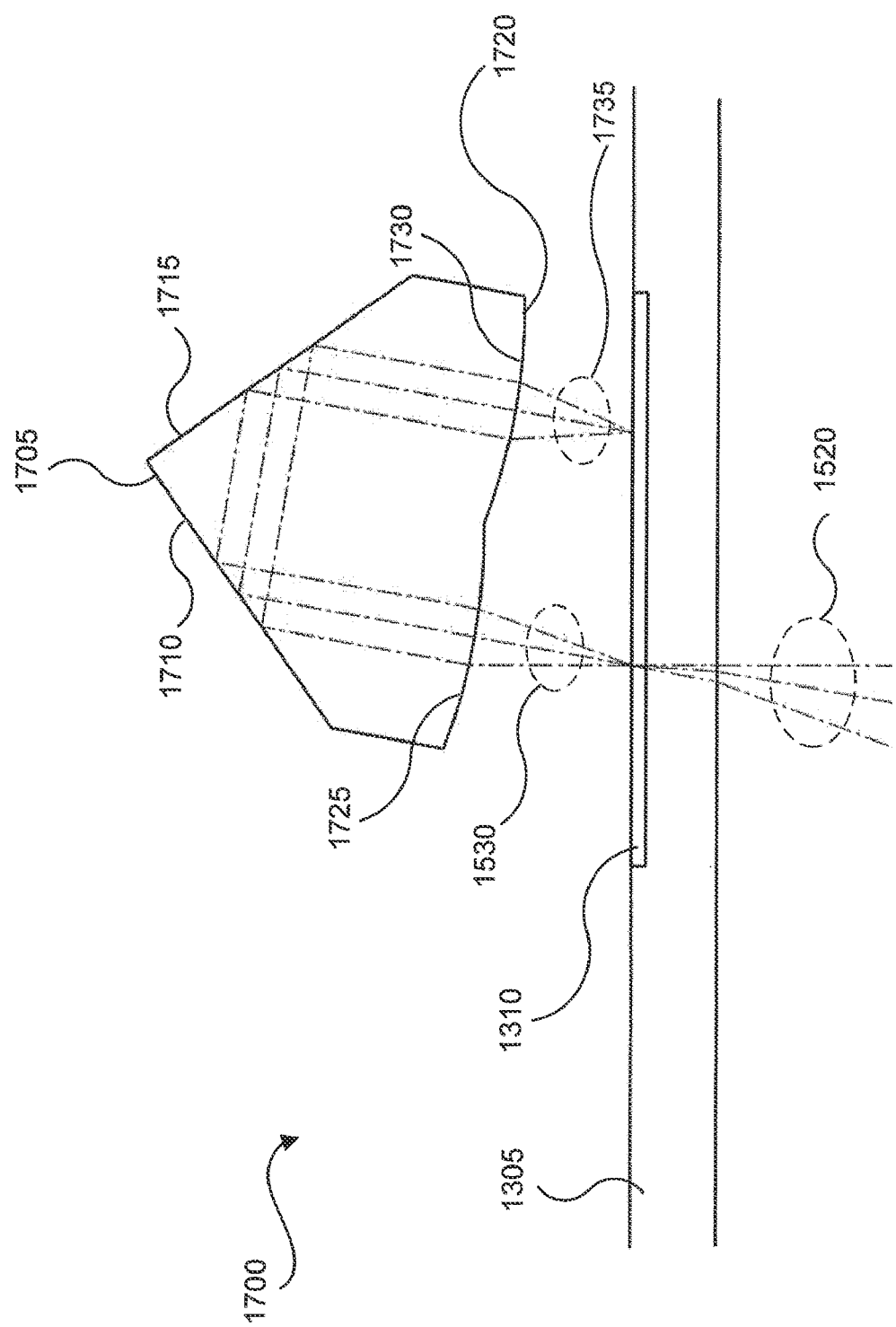
FIG. 17 shows a schematic, cross-sectional representation of yet another example optical element, in accordance with an example implementation of the present disclosure.

Turning now to FIG. 17, a schematic, cross-sectional representation is shown of an example optical element 1700. Optical element 1700 may be similar to optical element 1500. A difference between optical elements 1700 and 1500 is that optical element 1700 comprises a reflector 1705 optically coupled with IC 1310. Reflector 1705 comprises two reflective sides 1710 and 1715. Reflector 1705 also comprises a curved transmissive side 1720. Curved transmissive side 1720 may form two lenses 1725 and 1730 to reduce a divergence of the beams passing through side 1720. Curved side 1720 and its lenses 1725 and 1730 may comprise a divergence-reducing element of reflector 1705.

Moreover, in some examples, reflector 1705 may comprise a prism. Non-incoupled beams 1530 may enter reflector 1705 via lens 1725, which reduces the beams' divergence. The beams are then reflected from sides 1710 and 1715, and pass through lens 1730 on their way back to IC 1310 to form reflected beams 1735. Lens 1730 may further reduce the divergence of the beams as they propagate from reflective side 1715 towards IC 1310.

Figure 18:
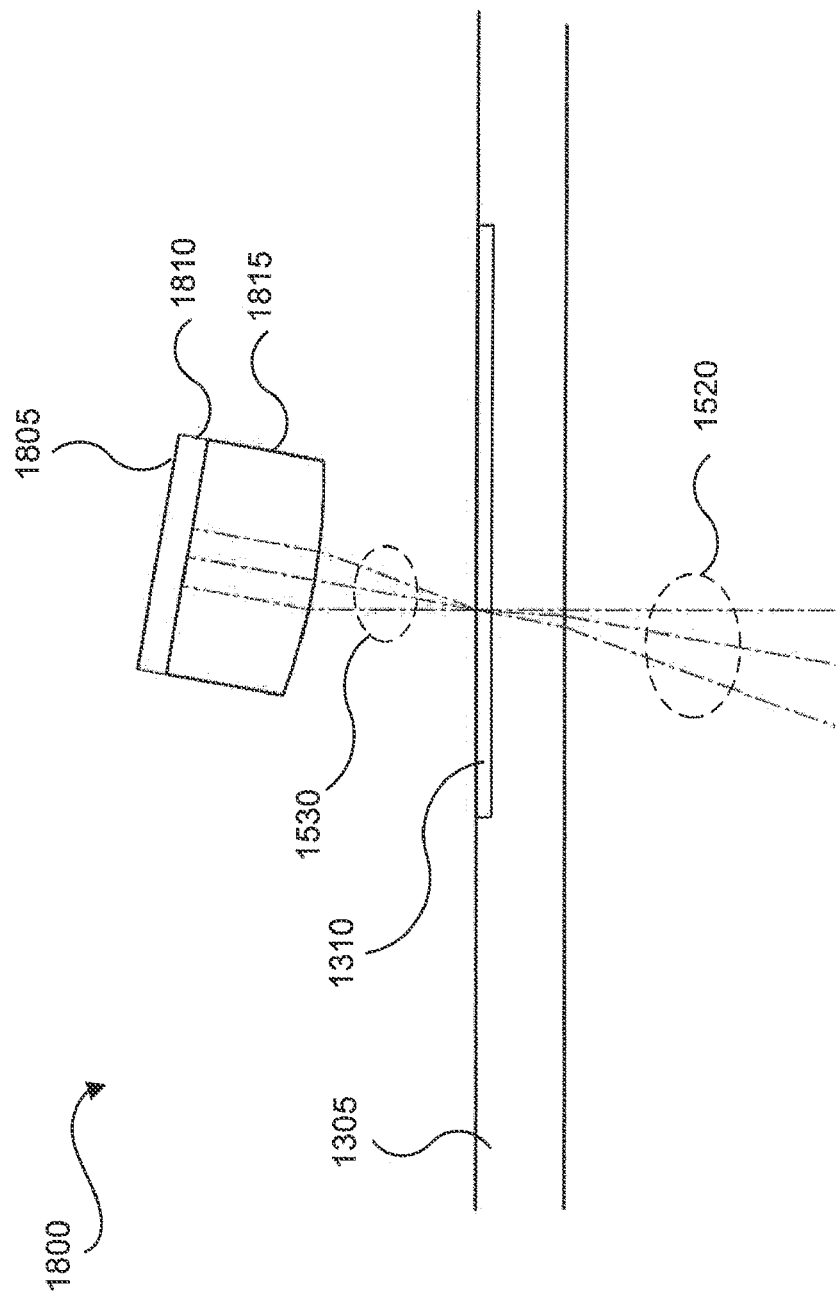
FIG. 18 shows a schematic, cross-sectional representation of yet another example optical element, in accordance with an example implementation of the present disclosure.

FIG. 18, in turn, shows a schematic, cross-sectional representation of an example optical element 1800. Optical element 1800 may be similar to optical element 1500. A difference between optical elements 1800 and 1500 is that optical element 1800 comprises a reflector 1805, having a reflector 1810 and a lens 1815. Lens 1815 may reduce a divergence of non-incoupled beams 1530 both when they pass through lens 1815 on their way to reflector 1810, and when the beams pass back through lens 1815 on their way from reflector 1810 towards IC 1310.

Figure 19:
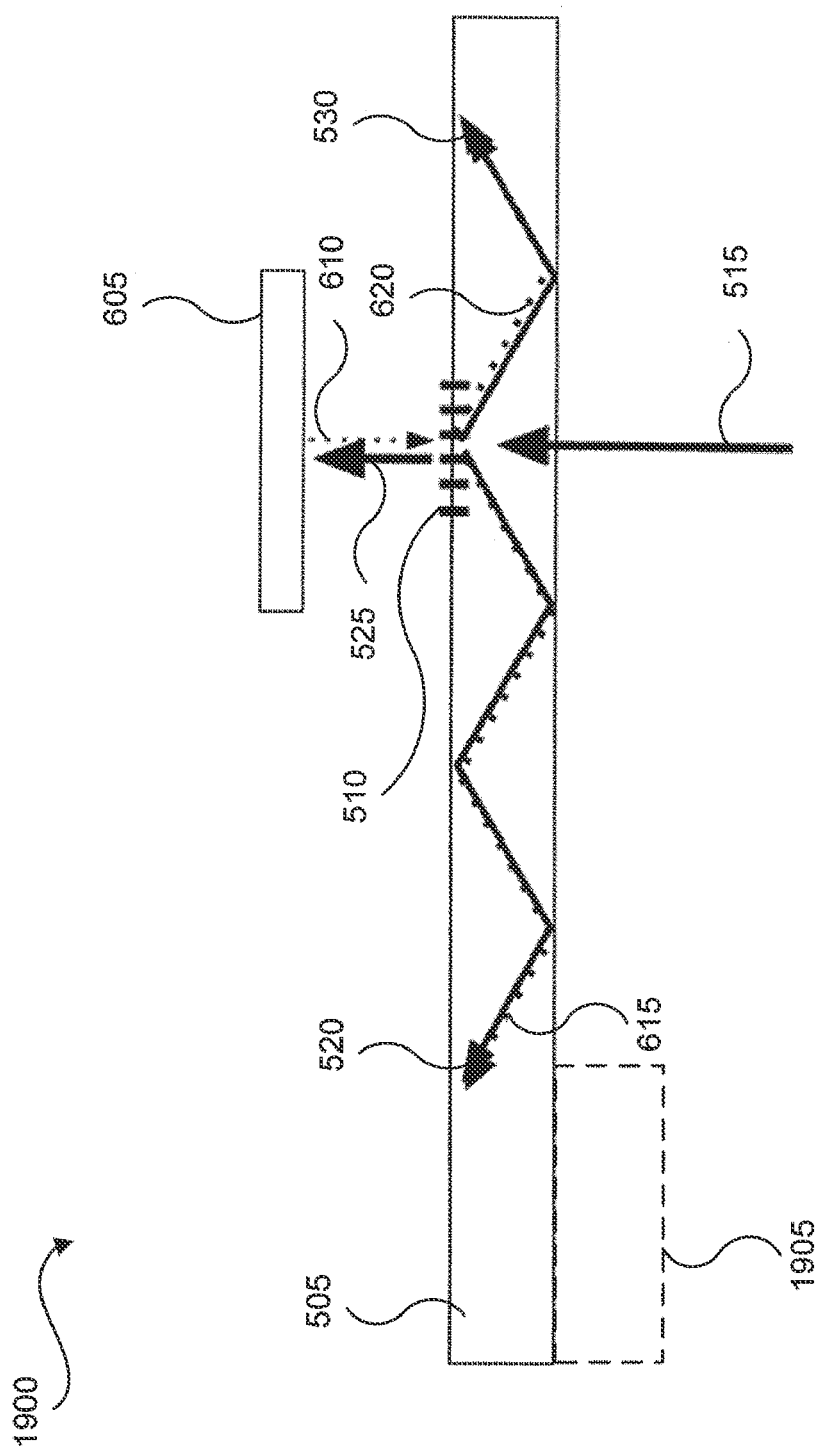
FIG. 19 shows a schematic, cross-sectional representation of yet another example optical element, in accordance with an example implementation of the present disclosure.

Moreover, FIG. 19 shows a schematic, cross-sectional representation of an example optical element 1900. Optical element 1900 may be similar to optical element 600. A difference between optical elements 1900 and 600 is that optical element 1900 comprises an OC 1905 optically coupled to lightguide 505. OC 1905 may direct at least a corresponding portion of each of incoupled beams 520 and 615 out of lightguide 505 to form outcoupled beams (not shown in FIG. 19) propagating towards an eye of a user to form an image viewable by the user.

In some examples, OC 1905 may comprise a diffractive optical element such as a SRG, a hologram, or the like. In some examples OC 1905 may be disposed proximate the surface of lightguide 505 proximate to which surface IC 510 is disposed. As shown in FIG. 19, incoupled beams 520 and 615 propagate inside lightguide 505 towards OC 1905, while beams 530 and 620 propagate inside lightguide 505 away from OC 1905. As with optical element 1900, the other optical elements described herein may also comprise corresponding OCs.

Figure 20:
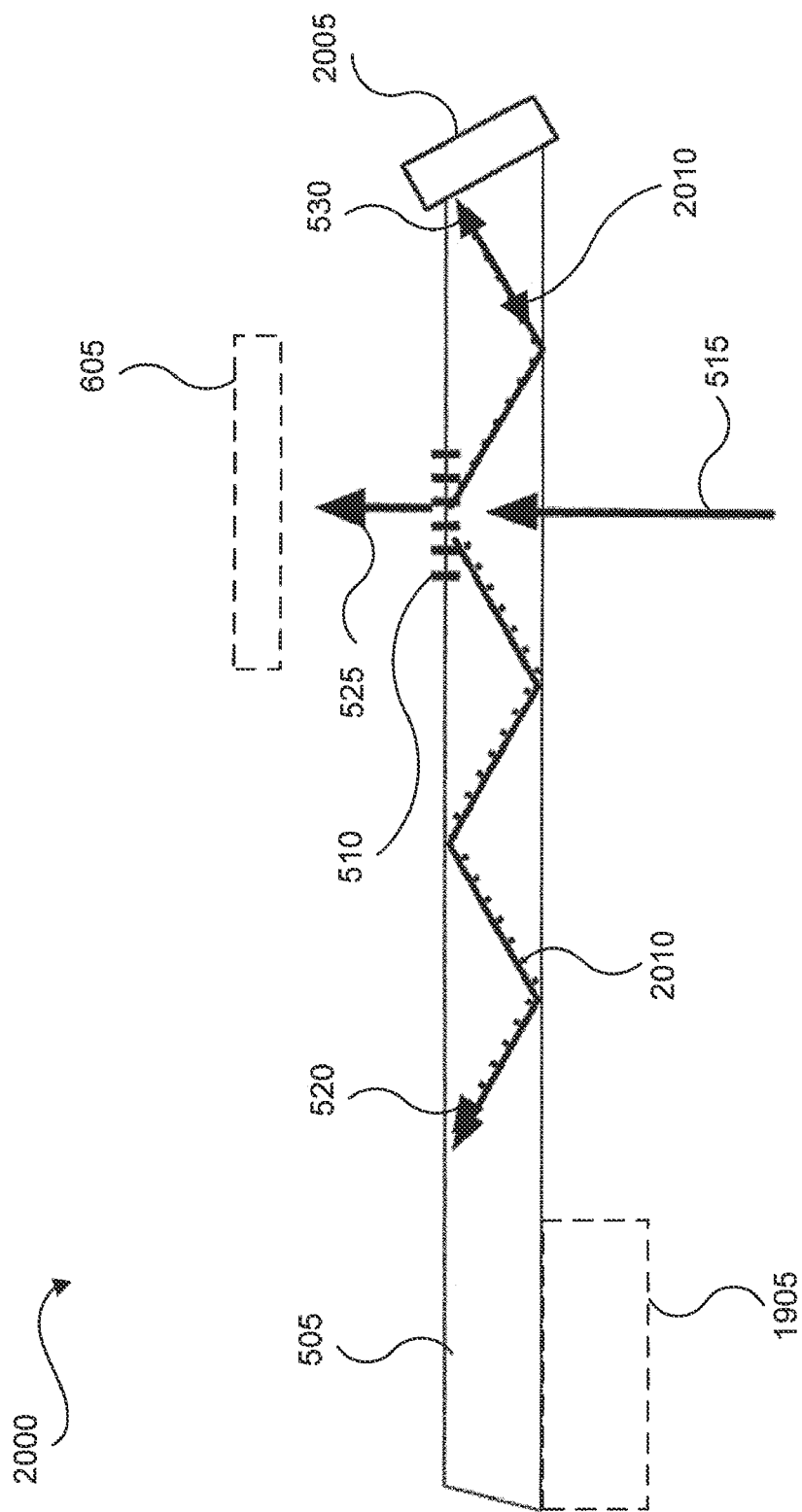
FIG. 20 shows a schematic, cross-sectional representation of yet another example optical element, in accordance with an example implementation of the present disclosure.

Turning now to FIG. 20, a schematic, cross-sectional representation is shown of an example optical element 2000. Optical element 2000 may be similar to optical element 1900. A difference between optical elements 2000 and 1900 is that optical element 2000 comprises a further reflector 2005 optically coupled to lightguide 505. Reflector 2005 may reflect beam 530 to form a further reflected beam 2010 propagating in lightguide 505 towards OC 1905. In this manner, at least a portion of beam 530 may be captured or recycled by forming reflected beam 2010 which propagates towards OC 1905 and may be used to form images viewable by a user of a display incorporating optical element 2000.

In some examples, reflector 2005 may be secured to lightguide 505 and may be disposed in the optical path of beam 530 in lightguide 505. In some examples, reflector 2005 need not be secured or physically attached to lightguide 505. In such examples, reflector 2005 may be optically coupled with lightguide 505. Such optical coupling may be direct, or may use intervening optical elements to direct light between lightguide 505 and reflector 2005. Examples of such optical elements may include reflectors, lenses, lightguides, and the like. Furthermore, in some examples, reflector 2005 may comprise a metalized layer or reflector, a prism, a beam splitter, a dichroic, a diffractive optical element, and the like.

In addition, in some examples, reflector 2005 may comprise a side or facet of lightguide 505. In some examples, this side or facet may be metalized or otherwise rendered reflective to beam 530. Furthermore, in some examples, the side or facet may be at an angle relative to beam 530 that allows the side or facet to reflect beam 530 using total internal reflection.

In FIG. 20, reflector 605 and OC 1905 are shown in dashed lines to signify that in some examples, optical element 2000 need not comprise reflector 605 or OC 1905. In examples that do not comprise reflector 605, beam 530 may be recycled, and non-incoupled beam 525 need not be recycled. Moreover, in examples where optical element 2000 does not comprise OC 1905, incoupled beam 520 and beam 2010 may be outcoupled from lightguide 505 using an OC that is distinct from optical element 2000, or using another component. This other optical component may be in optical element 2000, or may be outside of optical element 2000 and optically coupled to optical element 2000.

Figure 21:
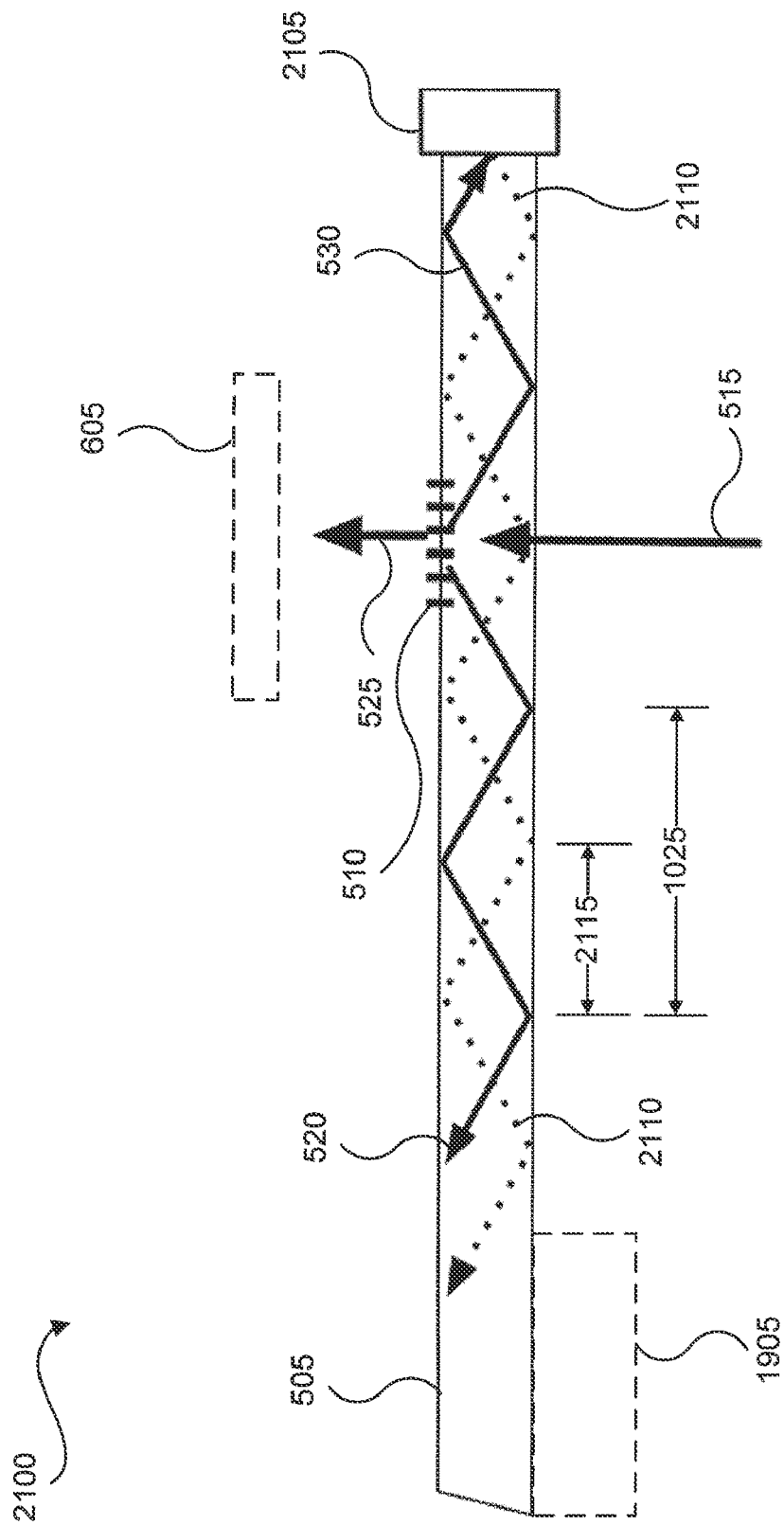
FIG. 21 shows a schematic, cross-sectional representation of yet another example optical element, in accordance with an example implementation of the present disclosure.

In addition, in optical element 2000, reflector 2005 is oriented relative to lightguide 505 to direct reflected beam 2010 along an optical path inside lightguide 505 that is about coincident with a corresponding optical path of beam 530 inside lightguide 505. In some examples, reflector 2005 may be oriented differently relative to lightguide 505. FIG. 21 shows a schematic, cross-sectional representation of an example optical element 2100 whose reflector 2105 has such a different orientation.

Optical element 2100 may be similar to optical element 2000, with a difference between optical elements 2100 and 2000 being that optical element 2100 comprises a reflector 2105 that is oriented relative to lightguide 505 differently than the orientation of reflector 2005 relative to lightguide 505. Reflector 2105 may be similar in structure or function to reflector 2005. Reflector 2105 may reflect beam 530 to form a further reflected beam 2110 propagating in lightguide 505 towards OC 1905. The orientation of reflector 2105 may allow it to direct reflected beam 2110 along an optical path inside lightguide 505 that is offset from the corresponding optical paths of beam 530 and incoupled beam 520 inside lightguide 505.

Reflected beam 2110 and incoupled beam 520 may both be described as offspring beams of display beam 515. The offsetting of the optical path of reflected beam 2110 relative to the optical paths of beam 530 and incoupled beam 520 may cause the bounce positions of reflected beam 2110 inside lightguide 505 to be offset from the corresponding bounce positions of incoupled beam 520 inside lightguide 505. This offsetting of the bounce positions of the offspring beams (beams 520 and 2110) of display beam 515 may cause these incoupled offspring beams to have an bounce separation 2115, which may be shortened compared to bounce separation 1025 of incoupled beam 520.

In addition, the offsetting of the optical path of reflected beam 2110 relative to the optical paths of beams 520 and 530 may allow reflected beam 2110 to avoid having a bounce position on IC 510. Having a bounce position on IC 510 may allow IC 510 to cause a portion of beam 2110 to be lost (e.g. leave lightguide 505 as a non-incoupled beam). Avoiding a bounce position on IC 510 may allow reflected beam 2110 to avoid being subject to losses caused by IC 510.

In FIG. 21, reflector 605 and OC 1905 are shown in dashed lines to signify that in some examples, optical element 2100 need not comprise reflector 605 or OC 1905. In examples that do not comprise reflector 605, beam 530 may be recycled, and non-incoupled beam 525 need not be recycled. Moreover, in examples where optical element 2100 does not comprise OC 1905, incoupled beam 520 and beam 2110 may be outcoupled from lightguide 505 using an OC that is distinct from optical element 2100, or using another component. This other optical component may be in optical element 2100, or may be outside of optical element 2100 and optically coupled to optical element 2100.

Furthermore, in some examples the optical elements described herein, including optical elements 500, 600, 700, 800, 900, 1000, 1100, 1200, 1300, 1500, 1600, 1700, 1800, 1900, and the other optical elements described herein, may comprise a reflector similar to reflectors 2005 or 2105. Moreover, in some examples the optical elements described herein may comprise corresponding reflectors comprising other optical systems such as a 4F relay, an Offner relay, and the like. In addition, in examples where the functioning of the optical element, or the display incorporating the optical element, may be sensitive to the polarization of the display light, the optical elements or their reflectors may comprise corresponding polarization adjusting components such as quarter-wave plates, and the like.

Moreover, while FIGS. 3 and 4 show a given optical element having a given arrangement of lightguide, incoupler, and outcoupler, in some examples the optical element may have a different structure, and that the lightguide, incoupler, and outcoupler may be arranged differently relative to one another. In addition, while some of the examples provided herein are described in the context of laser projectors and WHUDs, the functions and methods described herein may be implemented in or by display systems or devices which may not use laser projectors or be WHUDs.

Throughout this specification and the appended claims, infinitive verb forms are often used. Examples include, without limitation: "to form," "to direct," "to receive," "to outcouple," and the like. Unless the specific context requires otherwise, such infinitive verb forms are used in an open, inclusive sense, that is as "to, at least, form," "to, at least, direct," "to, at least, receive," and so on.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An optical element comprising:
    a lightguide;
    an incoupler optically coupled to the lightguide, the incoupler to receive a display beam incident upon the lightguide at a first incidence position, the incoupler to direct a first portion of the display beam into the lightguide to form an incoupled beam and to cause a second portion of the display beam to remain non-incoupled relative to the lightguide to form a non-incoupled beam; and
    a reflector to receive the non-incoupled beam and reflect the non-incoupled beam towards the incoupler to form a reflected beam incident upon the incoupler at a second incidence position, the incoupler to direct a corresponding portion of the reflected beam into the lightguide to form a further incoupled beam.

2. The optical element of claim 1, wherein the reflector comprises a reflective metalized layer disposed on a surface of the lightguide.

3. The optical element of claim 1, wherein the reflector comprises a prism optically coupled to the incoupler.

4. The optical element of claim 3, wherein the prism comprises a reflective side.

5. The optical element of claim 4, wherein the reflective side is curved to reduce a divergence of at least one of the non-incoupled beam and the reflected beam.

6. The optical element of claim 4, wherein the prism comprises a further reflective side.

7. The optical element of claim 6, wherein the further reflective side is curved to reduce a divergence of at least one of the non-incoupled beam and the reflected beam.

8. The optical element of claim 3, wherein the prism comprises a curved transmissive side to reduce a divergence of at least one of the non-incoupled beam and the reflected beam.

9. The optical element of claim 1, wherein the reflector is to direct the reflected beam towards the incoupler to position the second incidence position to be substantially the same as the first incidence position.

10. The optical element of claim 1, wherein the reflector is to direct the reflected beam towards the incoupler to position the second incidence position to be spaced from the first incidence position.

11. The optical element of claim 10, wherein:
    the incoupled beam has a bounce separation between adjacent bounces of the incoupled beam inside the lightguide; and
    the reflector is to direct the reflected beam towards the incoupler to position the second incidence position to be at a distance from the first incidence position, the distance being a non-integer multiple of the bounce separation.

12. The optical element of claim 1, wherein the reflector further comprises a divergence-reducing element disposed in an optical path of at least one of the non-incoupled beam and the reflected beam between the incoupler and the reflector, the divergence-reducing element to reduce a divergence of the at least one of the non-incoupled beam and the reflected beam.

13. The optical element of claim 12, wherein the divergence-reducing element comprises at least one of one of: a concave reflector; or a lens.

14. The optical element of claim 12, wherein the divergence-reducing element is to adjust the divergence of the reflected beam at the second incidence position to be substantially the same as a corresponding divergence of the display beam at the first incidence position.

15. The optical element of claim 1, further comprising an outcoupler optically coupled to the lightguide, the outcoupler to direct at least a corresponding portion of each of the incoupled beam and the further incoupled beam out of the lightguide to form outcoupled beams propagating towards an eye of a user to form an image viewable by the user.

16. The optical element of claim 15, wherein:
    the incoupler is further to direct a third portion of the display beam into the lightguide, the first portion of the display beam propagating in the lightguide towards the outcoupler and the third portion of the display beam propagating in the lightguide away from the outcoupler; and
    the optical element further comprising a further reflector optically coupled to the lightguide, the further reflector to reflect the third portion of the display beam to form a further reflected beam propagating in the lightguide towards the outcoupler.

17. The optical element of claim 16, wherein the further reflector is secured to the lightguide and is disposed in an optical path of the third portion of the display beam in the lightguide and is one of:
    oriented relative to the lightguide to direct the further reflected beam along an optical path inside the lightguide that is about coincident with a corresponding optical path of the third portion of the display beam inside the lightguide; or
    oriented relative to the lightguide to direct the further reflected beam along an optical path inside the lightguide that is offset from a corresponding optical path of the third portion of the display beam inside the lightguide.

18. A heads-up display comprising the optical element of claim 1.

19. An optical element comprising:
a lightguide;
an incoupler and an outcoupler optically coupled to the lightguide;
the incoupler to:
receive a display beam incident upon the lightguide at a first incidence position;
direct a first portion of the display beam into the lightguide to form an incoupled beam, the first portion of the display beam propagating in the lightguide towards the outcoupler; and
direct a second portion of the display beam into the lightguide, the second portion of the display beam propagating in the lightguide away from the outcoupler; and
the outcoupler to:
direct at least a corresponding portion of the incoupled beam out of the lightguide to form an outcoupled beam propagating towards an eye of a user to form an image viewable by the user; and
a reflector optically coupled to the lightguide, the reflector to reflect the second portion of the display beam back into the lightguide to form a reflected beam propagating in the lightguide towards the outcoupler.

20. The optical element of claim 19, wherein the reflector is secured to the lightguide and is disposed in an optical path of the second portion of the display beam in the lightguide, and at least one of:
oriented relative to the lightguide to direct the reflected beam along an optical path inside the lightguide that is about coincident with a corresponding optical path of the second portion of the display beam inside the lightguide; or
oriented relative to the lightguide to direct the reflected beam along an optical path inside the lightguide that is offset from a corresponding optical path of the second portion of the display beam inside the lightguide.

21. The optical element of claim 19, wherein:
the incoupler is further to cause a third portion of the display beam to remain non-incoupled relative to the lightguide to form a non-incoupled beam; and
the optical element further comprising:
a reflector to receive the non-incoupled beam and reflect the non-incoupled beam towards the incoupler to form a further reflected beam incident upon the incoupler at a second incidence position, the incoupler to direct a corresponding portion of the further reflected beam into the lightguide to form a further incoupled beam; and
wherein the outcoupler is further to outcouple a corresponding portion of the further incoupled beam to form a further outcoupled beam propagating towards the eye of the user.

22. A heads-up display comprising the optical element of claim 19.

* * * * *